US012697789B2

(12) United States Patent
Zympeloudis

(10) Patent No.: US 12,697,789 B2
(45) Date of Patent: Aug. 4, 2026

(54) TAPE LAYING HEAD

(71) Applicant: ICOMAT LIMITED, Bristol (GB)

(72) Inventor: Evangelos Zympeloudis, Bristol (GB)

(73) Assignee: ICOMAT LIMITED, Bristol (GB)

( * ) Notice: Subject to any disclaimer, the term of this patent is extended or adjusted under 35 U.S.C. 154(b) by 72 days.

(21) Appl. No.: 18/245,646

(22) PCT Filed: Oct. 9, 2020

(86) PCT No.: PCT/GB2020/052536
§ 371 (c)(1),
(2) Date: Mar. 16, 2023

(87) PCT Pub. No.: WO2022/058703
PCT Pub. Date: Mar. 24, 2022

(65) Prior Publication Data
US 2023/0311430 A1 Oct. 5, 2023

(30) Foreign Application Priority Data

Sep. 17, 2020 (GR) ............................... 20200100565

(51) Int. Cl.
*B29C 70/38* (2006.01)
*B29K 105/08* (2006.01)
(52) U.S. Cl.
CPC .... *B29C 70/388* (2013.01); *B29K 2105/0872* (2013.01)
(58) Field of Classification Search
CPC ..... B29C 70/38; B29C 70/382; B29C 70/384; B29C 70/386; B29C 70/388; B29C 70/56; B29K 2105/0872
See application file for complete search history.

(56) References Cited

U.S. PATENT DOCUMENTS 4,707,212 A 11/1987 Hailey et al.
5,269,869 A * 12/1993 Peterson ............... B29C 70/388
156/488

(Continued)

FOREIGN PATENT DOCUMENTS

EP 2 508 327 A1 10/2012
EP 3 248 765 A2 11/2017
(Continued)

OTHER PUBLICATIONS

Office Action issued in Japanese Patent Application No. 2023-518412 dated Aug. 20, 2024.

(Continued)

*Primary Examiner* — George R Koch
(74) *Attorney, Agent, or Firm* — MARSHALL, GERSTEIN & BORUN LLP

(57) ABSTRACT

A tape laying head configured to lay a tow material on a mould in the construction of a composite structure, the tape laying head including: a shearing mechanism configured to receive tow material from a tow supply and to steer the tow material by applying shear deformation to the tow material between a pair of shear boundaries defined by the shearing mechanism, the shearing mechanism being further configured to apply a driving force to the tow material, the driving force having a longitudinal component and a transverse component with respect to the tow material during steering of the tow material; and a tension control system configured to control the transverse component of the driving force acting on the tow material to be equal to or less than a maximum transverse frictional force associated with the shearing mechanism by varying a tensioning force applied to the tow material by the tension control system and monitoring the driving force.

32 Claims, 20 Drawing Sheets

(56) References Cited

U.S. PATENT DOCUMENTS

| | | | |
|---|---|---|---|
| 5,979,531 | A | 11/1999 | Barr et al. |
| 6,453,962 | B1 | 9/2002 | Pratt |
| 8,012,291 | B2 | 9/2011 | Kisch et al. |
| 8,308,101 | B2 | 11/2012 | McCowin |
| 10,399,289 | B2 | 9/2019 | Amari et al. |
| 2005/0139324 | A1 | 6/2005 | Meyer |
| 2006/0073309 | A1* | 4/2006 | Hogg .................... B29C 70/386 428/156 |
| 2009/0032195 | A1 | 2/2009 | Slyne |
| 2009/0229760 | A1 | 9/2009 | Hamlyn et al. |
| 2014/0174638 | A1* | 6/2014 | Wandeler .............. B29C 70/384 242/476.7 |
| 2015/0328876 | A1* | 11/2015 | Nishimura .......... B32B 37/0053 156/64 |
| 2015/0360424 | A1* | 12/2015 | Williams .............. B29C 70/388 156/289 |
| 2020/0139647 | A1* | 5/2020 | Shaw ................... B29C 70/388 |

FOREIGN PATENT DOCUMENTS

| | | | |
|---|---|---|---|
| FR | 2 539 122 | A1 | 7/1984 |
| GB | 2 492 594 | A | 1/2013 |
| WO | WO-2014/107241 | A1 | 7/2014 |

OTHER PUBLICATIONS

Examination Report issued in European Patent Application No. 20825153.8 dated Jun. 26, 2024.

International Search Report and Written Opinion for Application No. PCT/GB2020/052536, dated Aug. 2, 2021.

Examination Report issued in European Patent Application No. 20825153.8 dated Jun. 23, 2025.

* cited by examiner

1
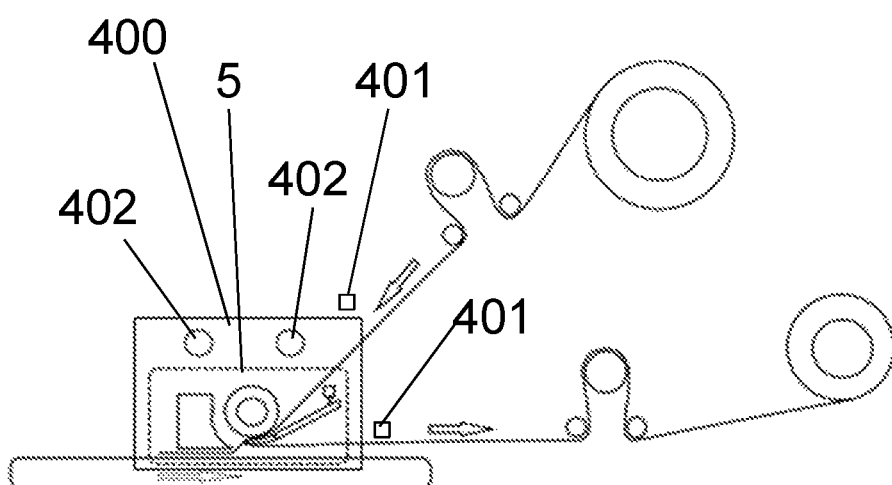
400
5
401
402
402
401
Figure 16

1

600

5

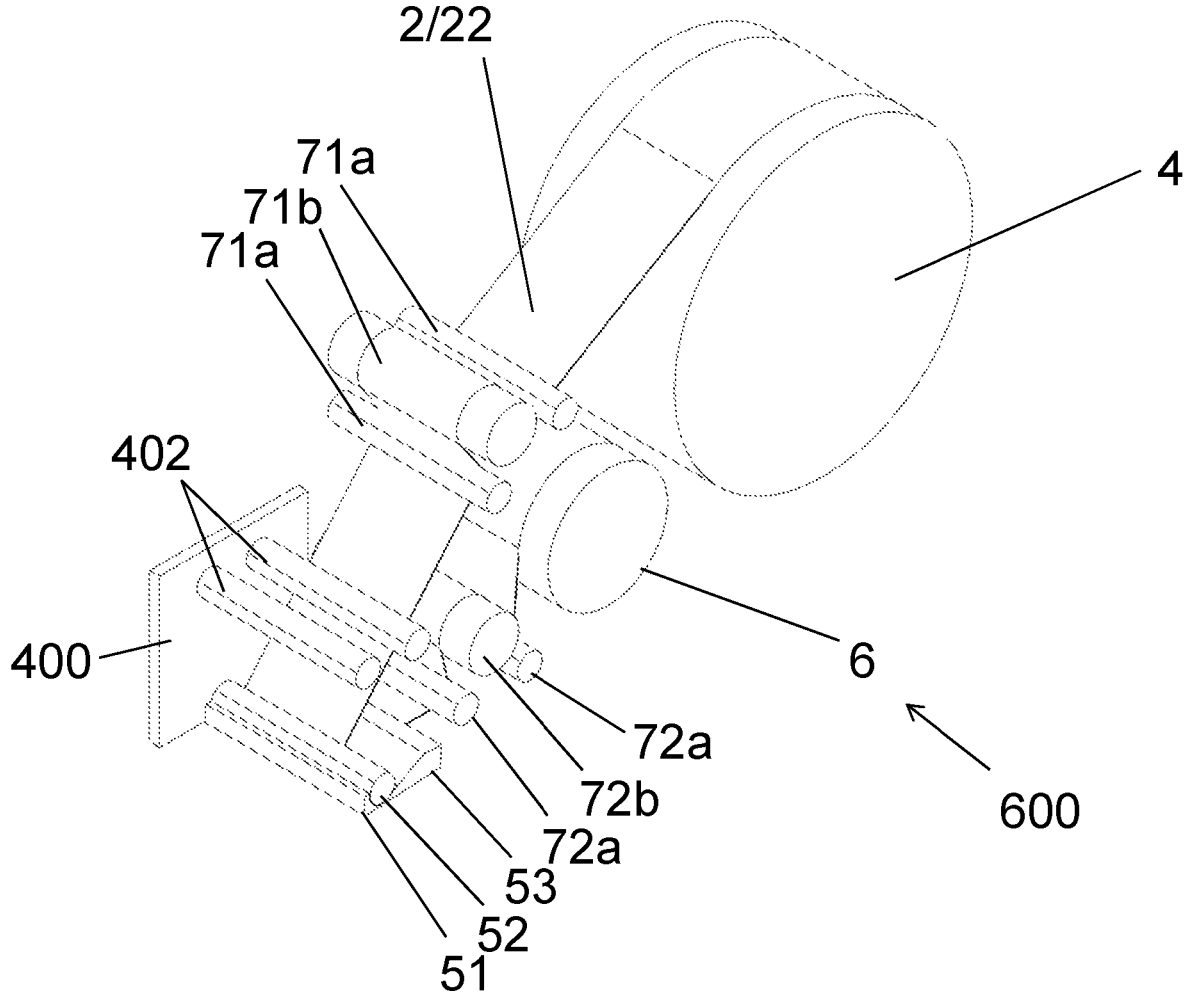
<u>Figure 21</u>

TAPE LAYING HEAD

DESCRIPTION OF THE INVENTION

Embodiments of the present invention relate to: a tape laying head configured to lay a tow material on a mould in the construction of a composite structure; a controller for use in a tension control system of a tape laying system; an associated control method; and an associated computer readable medium.

Composite materials, having a matrix material (e.g. a thermosetting resin) forming a matrix holding elongate reinforcement elements (e.g. carbon fibres), are commonly used to provide strong and lightweight structures. Such materials are now used in a wide range of different applications—from sports equipment to the aerospace industry.

Composite structures may be formed using tapes or tows of substantially parallel carbon fibres (the terms "tape" and "tow" are used synonymously herein, although a tape may include a plurality of tows). The tow may be pre-impregnated with the matrix material or the matrix material may be added at a later time in the manufacturing process. The tows are laid on a mould structure in layers. The laid-up mould structure is then heated, e.g. in an autoclave, under pressure to polymerise the matrix material and form the composite structure (which is later removed from the mould).

The laying of the tow on the mould structure may require the tow to be traversed through one or more bends or curves. This can impact the parallel arrangement of the carbon fibres in the tow—as the path lengths for the fibres differ depending on their position with respect to the width of the tow (e.g. in the inside or outside of the bend or curve). The effects can include, for example, structural defects, such as buckling of the carbon fibres or movement to a non-parallel arrangement, or misalignment with the intended tow laying path. These issues can impact the properties of the resulting composite structure detrimentally.

There is also a desire, in general, to improve acceleration and declaration times for the tow laying process—as this can have a significant impact on the overall speed of a tow laying operation (which typically includes multiple stop-start processes requiring deceleration and acceleration).

U.S. Pat. No. 6,453,962 discloses an apparatus which is used to form wavy pre-impregnated tow material. However, the document provides no teachings regarding the laying of the resulting tow on a mould structure and the teachings are, therefore, irrelevant to arrangements and techniques for laying the resulting tow—the disclosed apparatus being unsuitable for such a purpose. In addition, complex arrangements are required in order to alleviate issues concerning slack in the reinforcement elements as a result of varying roller rotational rate requirements. Furthermore, the fixed width of the combination and pinch rollers limits the degree of wave which can be achieved in pre-impregnated material produced using this apparatus. In addition, there is no means disclosed to allow each tow path within a structure to have a different angle variation with respect to a reference axis.

FR2539122 relates to a machine for coating a surface with a fibre/resin composite material in strip form. According to the document, a head for laying down a strip on a surface is mounted so as to be able to pivot with respect to its support so that its mid-perpendicular plane always remains perpendicular to the line of contact of the strip with the surface regardless of the irregularities of the latter. This machine is said to be used for producing various structures in the aeronautical construction field.

US2009/032195 discloses an automated tape head assembly for a multiple axis tape laying machine which includes a tape supply reel and a tape compaction roller. Tape from the supply reel passes through a space between the two independent structures of the supply reel and compaction roller defining a tape path that substantially maintains a zero Gaussian curvature of the tape. The tape path is a curved path referred to as a compliance loop that is said to result from a substantially or partially unrestrained curved path between the supply reel and the compaction roller. This structure is said to allow the compaction roller to shift laterally and vertically with respect to the supply reel while the supply reel is in a fixed position with respect to the tape head assembly generally. This structure allegedly also allows the compaction roller to roll, steer, and follow the fibre tape's natural path, all with independence from the supply reel.

EP2508327 teaches a method which involves using a processing element that presses a strip and limits a twisting section at an end. The strip is eccentrically twisted in the twisting section such that the strip obtains a lateral curvature at the processing element. The direction and the degree of the twisting is said to be elected such that a longitudinal difference in the twisting section is compensated.

US2005/139324 teaches a reinforcement strip which is laid on a rotating receiving surface during the manufacture of a tyre. The strip passes through a guide which is moved alternatingly transversely relative to a travel path of the strip, whereby the strip is laid in an undulating pattern on the receiving surface. The amplitude of the alternating transverse movement is varied as a function of a ratio of: (a) the speed of a portion of the strip approaching the guide, and (b) the speed of the receiving surface. Between the guide and the receiving surface the strip is pivoted by 90 degrees about the strip's longitudinal axis so as to be laid tangentially on the receiving surface.

GB2492594 discloses a tow placement head member to lay a tow tape comprising reinforcement fibres and a matrix or binder material, the tow placement head member being for use in the formation of a variable angle tow composite structure and comprising: a pinch arrangement configured to receive a tow tape and to allow the tow tape to pass therethrough, the pinch arrangement comprising a tow feed roller and a tow feed shoe configured to guide the tow tape towards a compaction shoe; and a compaction shoe configured to receive tow tape from the pinch arrangement and to press the tow tape against a surface on which the tow tape is to be laid, wherein the pinch arrangement is configured to apply shear deformation to a portion of the tow tape between the compaction shoe and the pinch arrangement.

US2009/0229760 discloses a fibre application machine including a fibre application head with an application roller for the production of parts made of composite materials. The fibre application head further includes a guiding system to guide the fibres onto the application roller and/or means for the application of resin to each fibre as the fibres leave the guiding system. The fibre application machine can also include a fibre storing system and conveying means for conveying the fibres from the fibre storing system to the application head. The conveying means can comprise flexible tubes each tube being able to receive a fibre in its inner channel. The conveying means can further include a tension limiting system positioned between the application head and the storing system. The fibre application machine can further include a system for moving the application head.

U.S. Pat. No. 8,012,291 teaches a method of removing backing film from a roll of tape used for tape laying or fibre placement comprising: unwinding tape from a spool while the backing film is still attached to the tape; extending a portion of the tape with the backing film still attached around a take-up roller; partially removing the backing film from the tape and attaching the backing film to the take-up roller; extending a portion of the tape with the backing film removed from the take-up roller to a dancer roller; and wrapping the backing film continuously around the take-up roller as the take-up roller is driven by movement of the tape around the take-up roller as the tape is moved from the spool to the dancer roller, wherein the take-up roller comprises a freely rotating take-up roller driven only by the movement of the tape around the take-up roller.

U.S. Pat. No. 8,308,101 discloses a fibre tensioning device for use with a spool of fibre from which fibres are drawn, comprising: a support; a hub rotatably mounted on the support, the hub being adapted to have the spool of fibres mounted thereon for rotation therewith on the support, said hub rotatably mounted for rotation around a shaft, said shaft stationary with respect to rotation of said hub around said shaft; and means for applying drag force on fibres being drawn from the spool, said means for applying drag force being located on the hub and comprising biasing means wherein a portion of said biasing means is fixed to said shaft.

In systems which may use a shearing mechanism, there is a desire to achieve higher shearing angles with a lower risk of breaking of the tow material, and to allow for easy tuning for differing laying operations.

The higher the tow material shearing stiffness, the harder it is to implement an effective shearing mechanism and the higher the risk of defects.

Embodiments seek to alleviate one or more problems associated with the prior art.

Accordingly, an aspect provides a tape laying head configured to lay a tow material on a mould in the construction of a composite structure, the tape laying head including: a shearing mechanism configured to receive tow material from a tow supply and to steer the tow material by applying shear deformation to the tow material between a pair of shear boundaries defined by the shearing mechanism, the shearing mechanism being further configured to apply a driving force to the tow material, the driving force having a longitudinal component and a transverse component with respect to the tow material during steering of the tow material; and a tension control system configured to control the transverse component of the driving force acting on the tow material to be equal to or less than a maximum transverse frictional force associated with the shearing mechanism by varying a tensioning force applied to the tow material by the tension control system and monitoring the driving force.

The tension control system may further include a first load sensor configured to generate a first load sensor signal representative of a tension of the tow material between the tow supply and the shearing mechanism, the first load sensor signal may be used in monitoring the driving force.

The tow material may be provided with a backing material, the shearing mechanism may be configured to separate the tow material from the backing material, and the tension control system may further include a second load sensor configured to generate a second load sensor signal representative of a tension of the backing material between the shearing mechanism and a backing material collector, the second load sensor signal may be used in monitoring the driving force.

The shearing mechanism may further include a tow guide roller and a gripping shoe or roller, and the tension control system may further include a first motor configured to drive rotation of the tow guide roller, the tension force may be at least partially applied by the first motor.

The tension control system may further include a second motor configured to drive operation of the backing material collector, the tension force may be at least partially applied by the second motor.

The tension control system may further include a brake associated with the tape supply and configured to brake the delivery of tow material from the tape supply to the shearing mechanism, the tension force may be at least partially applied by the brake.

The tension control system may be further configured to keep the driving force above a minimum threshold by varying the tension force.

The tow material may be a pre-impregnated tow material.

The shearing mechanism may include a compaction roller and a gripping shoe or roller, a first of the pair of shear boundaries being defined by a contact point between the compaction roller and the mould in normal operation and a second of the pair of shear boundaries being defined by a contact point between the compaction roller and the gripping shoe or roller.

The tape laying head may further include a web mechanism wherein the tow material may be provided with a web prior to shear deformation of the tow material and the web mechanism may be configured to remove the web from the tow material after the tow material has been laid on the mould.

The web mechanism may be further configured to add the web to the tow material prior to shear deformation of the tow material.

The web mechanism may include a source of web material and a web material collector associated with a motor, the motor being configured to operate the web material collector to pull the web from the source of web material.

A tape laying head may further include: a source of tow material and/or a backing material collector; and a slip compensation mechanism configured to move the shearing mechanism laterally with respect to the source of tow material and/or the backing material collector, such that lateral slip of the tow material is compensated.

The slip compensation mechanism may include: one or more rails configured to enable movement with respect to a part of the head of one or more of: the shearing mechanism, or a tow guide roller and a gripping shoe; and a driving arrangement to drive movement of the shearing mechanism, or the tow guide roller and the gripping shoe.

The slip compensation mechanism may further include a sensor configured to sense lateral slip of the tow material.

Another aspect provides a tape laying system including: a plurality of tape laying heads as above.

Another aspect provides a controller for use in a tension control system of a tape laying system, the tape laying system including a shearing mechanism configured to receive tow material from a tow supply and to steer the tow material by applying shear deformation to the tow material between a pair of shear boundaries defined by the shearing mechanism, the shearing mechanism being further configured to apply a driving force to the tow material, the driving force having a longitudinal component and a transverse component with respect to the tow material during steering of the tow material, wherein the controller is configured to control the transverse component of the driving force acting on the tow material to be equal to or less than a maximum transverse frictional force associated with the shearing mechanism by causing variation in a tensioning force applied to the tow material and monitoring the driving force.

The controller may be further configured to receive a first load sensor signal representative of a tension of the tow material between the tow supply and the shearing mechanism, the first load sensor signal may be used by the controller in monitoring the driving force.

The tow material may be provided with a backing material and the shearing mechanism may be configured to separate the tow material from the backing material, the controller may be further configured to receive a second load sensor signal representative of a tension of the backing material between the shearing mechanism and a backing material collector, the second load sensor signal may be used by the controller in monitoring the driving force.

The controller may be further configured to output a first motor signal, the shearing mechanism may further include a tow guide roller and a gripping shoe or roller, and a first motor may drive rotation of the tow guide roller, the first motor signal may control operation of the first motor and the tension force may be at least partially applied by the first motor.

The controller may be further configured to output a second motor signal, a second motor may drive operation of the backing material collector, the second motor signal may control operation of the second motor and the tension force may be at least partially applied by the second motor.

A brake may be associated with the tape supply and may be configured to brake the delivery of tow material from the tape supply to the shearing mechanism, the controller may be configured to generate a brake signal to control the brake and the tension force may be at least partially applied by the brake.

The controller may be further configured to keep the driving force above a minimum threshold by varying the tension force.

The tape laying system may further include a web mechanism, the tow material being provided with a web prior to shear deformation of the tow material and the controller may be further configured to operate the web mechanism to remove the web from the tow material after the tow material has been laid on the mould.

The controller may be further configured to operate the web mechanism to add the web to the tow material prior to shear deformation of the tow material.

The web mechanism may include a source of web material and a web material collector associated with a motor, the controller being further configured to operate the motor to pull the web from the source of web material.

The tape laying system may further include: a source of tow material and/or a backing material collector, and a slip compensation mechanism; and wherein the controller may be further configured to operate the slip compensation mechanism to move the shearing mechanism laterally with respect to the source of tow material and/or the backing material collector, such that lateral slip of the tow material is compensated.

The slip compensation mechanism may include: one or more rails configured to enable movement with respect to a part of the system of one or more of: the shearing mechanism, or a tow guide roller and a gripping shoe; and a driving arrangement, wherein the controller is configured to operate the driving arrangement to drive movement of the shearing mechanism, or the tow guide roller and the gripping shoe.

The controller may be further configured to receive a signal from a sensor, the signal being indicative of lateral slip of the tow material.

Another aspect provides a control method for use in a tension control system of a tape laying system, the tape laying system including a shearing mechanism configured to receive tow material from a tow supply and to steer the tow material by applying shear deformation to the tow material between a pair of shear boundaries defined by the shearing mechanism, the shearing mechanism being further configured to apply a driving force to the tow material, the driving force having a longitudinal component and a transverse component with respect to the tow material during steering of the tow material, the method including: controlling the transverse component of the driving force acting on the tow material to be equal to or less than a maximum transverse frictional force associated with the shearing mechanism by causing variation in a tensioning force applied to the tow material and monitoring the driving force.

A control method may further include: receiving a first load sensor signal representative of a tension of the tow material between the tow supply and the shearing mechanism, and using the first load sensor signal in monitoring the driving force.

The tow material may be provided with a backing material and the shearing mechanism may be configured to separate the tow material from the backing material, wherein the control method may further include: receiving a second load sensor signal representative of a tension of the backing material between the shearing mechanism and a backing material collector, and using the second load sensor signal in monitoring the driving force.

A control method may further include: outputting a first motor signal, wherein the shearing mechanism may further include a tow guide roller and a gripping shoe or roller, and a first motor may drive rotation of the tow guide roller, the first motor signal may control operation of the first motor and the tension force may be at least partially applied by the first motor.

A control method may further include: outputting a second motor signal, wherein a second motor may drive operation of the backing material collector, the second motor signal may control operation of the second motor and the tension force may be at least partially applied by the second motor.

A brake may be associated with the tape supply and may be configured to brake the delivery of tow material from the tape supply to the shearing mechanism, the control method may further include: generating a brake signal to control the brake, the tension force being at least partially applied by the brake.

A control method may further include: keeping the driving force above a minimum threshold by varying the tension force.

The tape laying system may further include a web mechanism, the tow material being provided with a web prior to shear deformation of the tow material and the method is further includes operating the web mechanism to remove the web from the tow material after the tow material has been laid on the mould.

The method may further include operating the web mechanism to add the web to the tow material prior to shear deformation of the tow material.

The web mechanism may include a source of web material and a web material collector associated with a motor, the method further including operating the motor to pull the web from the source of web material.

The tape laying system may further include: a source of tow material and/or a backing material collector, and a slip compensation mechanism; and wherein the method may further include operating the slip compensation mechanism to move the shearing mechanism laterally with respect to the source of tow material and/or the backing material collector, such that lateral slip of the tow material is compensated.

The slip compensation mechanism may include: one or more rails configured to enable movement with respect to a part of the system of one or more of: the shearing mechanism, or a tow guide roller and a gripping shoe; and a driving arrangement, wherein the method further includes operating the driving arrangement to drive movement of the shearing mechanism, or the tow guide roller and the gripping shoe.

The method may further include receiving a signal from a sensor, the signal being indicative of lateral slip of the tow material.

Another aspect provides a computer readable medium having instructions stored thereon which, when executed, cause the operation of the control method as above.

Another aspect provides a tape laying head configured to lay a tow material on a mould in the construction of a composite structure, the tape laying head including: a shearing mechanism configured to receive tow material from a tow supply and to steer the tow material by applying shear deformation to the tow material between a pair of shear boundaries defined by the shearing mechanism, the shearing mechanism being further configured to apply a driving force to the tow material, the driving force having a longitudinal component and a transverse component with respect to the tow material during steering of the tow material, wherein the shearing mechanism includes a compaction roller and a gripping shoe or roller, a first of the pair of shear boundaries being defined by a contact point between the compaction roller and the mould in normal operation and a second of the pair of shear boundaries being defined by a contact point between the compaction roller and the gripping shoe or roller.

Another aspect provides a tape laying head configured to lay a tow material on a mould in the construction of a composite structure, the tape laying head including: a shearing mechanism configured to receive tow material from a tow supply and to steer the tow material by applying shear deformation to the tow material between a pair of shear boundaries defined by the shearing mechanism, the shearing mechanism being further configured to apply a driving force to the tow material, the driving force having a longitudinal component and a transverse component with respect to the tow material during steering of the tow material; and a web mechanism wherein the tow material is provided with a web prior to shear deformation of the tow material and the web mechanism is configured to remove the web from the tow material after the tow material has been laid on the mould.

The web mechanism may be further configured to add the web to the tow material prior to shear deformation of the tow material.

The web mechanism may include a source of web material and a web material collector associated with a motor, the motor being configured to operate the web material collector to pull the web from the source of web material.

Another aspect provides a tape laying head configured to lay a tow material on a mould in the construction of a composite structure, the tape laying head including: a shearing mechanism configured to receive tow material from a tow supply and to steer the tow material by applying shear deformation to the tow material between a pair of shear boundaries defined by the shearing mechanism, the shearing mechanism being further configured to apply a driving force to the tow material, the driving force having a longitudinal component and a transverse component with respect to the tow material during steering of the tow material; a source of tow material and/or a backing material collector; and a slip compensation mechanism configured to move the shearing mechanism laterally with respect to the source of tow material and/or the backing material collector, such that lateral slip of the tow material is compensated.

The slip compensation mechanism may include: one or more rails configured to enable movement with respect to a part of the head of one or more of: the shearing mechanism, or a tow guide roller and a gripping shoe; and a driving arrangement to drive movement of the shearing mechanism, or the tow guide roller and the gripping shoe.

The slip compensation mechanism may further include a sensor configured to sense lateral slip of the tow material.

Another aspect provides a tape laying system including: a plurality of tape laying heads as above.

Another aspect provides a controller for use in a tension control system of a tape laying system, the tape laying system including: a shearing mechanism configured to receive tow material from a tow supply and to steer the tow material by applying shear deformation to the tow material between a pair of shear boundaries defined by the shearing mechanism, the shearing mechanism being further configured to apply a driving force to the tow material, the driving force having a longitudinal component and a transverse component with respect to the tow material during steering of the tow material, a web mechanism, the tow material being provided with a web prior to shear deformation of the tow material, wherein the controller is configured to operate the web mechanism to remove the web from the tow material after the tow material has been laid on the mould.

The controller may be further configured to operate the web mechanism to add the web to the tow material prior to shear deformation of the tow material.

The web mechanism may include a source of web material and a web material collector associated with a motor, the controller being further configured to operate the motor to pull the web from the source of web material.

Another aspect provides a controller for use in a tension control system of a tape laying system, the tape laying system including: a shearing mechanism configured to receive tow material from a tow supply and to steer the tow material by applying shear deformation to the tow material between a pair of shear boundaries defined by the shearing mechanism, the shearing mechanism being further configured to apply a driving force to the tow material, the driving force having a longitudinal component and a transverse component with respect to the tow material during steering of the tow material; a source of tow material and/or a backing material collector; and a slip compensation mechanism, wherein the controller is configured to operate the slip compensation mechanism to move the shearing mechanism laterally with respect to the source of tow material and/or the backing material collector, such that lateral slip of the tow material is compensated.

The slip compensation mechanism may include: one or more rails configured to enable movement with respect to a part of the tape laying system of one or more of: the shearing mechanism, or a tow guide roller and a gripping shoe; and a driving arrangement, wherein the controller is configured to operate the driving arrangement to drive movement of the shearing mechanism, or the tow guide roller and the gripping shoe.

The controller may be further configured to receive a signal from a sensor, the signal being indicative of lateral slip of the tow material.

Another aspect provides a control method for use in a tension control system of a tape laying system, the tape laying system including a shearing mechanism configured to receive tow material from a tow supply and to steer the tow material by applying shear deformation to the tow material between a pair of shear boundaries defined by the shearing mechanism, the shearing mechanism being further configured to apply a driving force to the tow material, the driving force having a longitudinal component and a transverse component with respect to the tow material during steering of the tow material, wherein the tape laying system further includes a web mechanism, the tow material being provided with a web prior to shear deformation of the tow material, the method including: operating the web mechanism to remove the web from the tow material after the tow material has been laid on the mould.

The method may further include operating the web mechanism to add the web to the tow material prior to shear deformation of the tow material.

The web mechanism may include a source of web material and a web material collector associated with a motor, the method further including operating the motor to pull the web from the source of web material.

Another aspect provides a control method for use in a tension control system of a tape laying system, the tape laying system including a shearing mechanism configured to receive tow material from a tow supply and to steer the tow material by applying shear deformation to the tow material between a pair of shear boundaries defined by the shearing mechanism, the shearing mechanism being further configured to apply a driving force to the tow material, the driving force having a longitudinal component and a transverse component with respect to the tow material during steering of the tow material, wherein the tape laying system further includes a web mechanism; a source of tow material and/or a backing material collector; and a slip compensation mechanism, and wherein the method includes operating the slip compensation mechanism to move the shearing mechanism laterally with respect to the source of tow material and/or the backing material collector, such that lateral slip of the tow material is compensated.

The slip compensation mechanism may include: one or more rails configured to enable movement with respect to a part of the tape laying system of one or more of: the shearing mechanism, or a tow guide roller and a gripping shoe; and a driving arrangement, wherein the method further includes operating the driving arrangement to drive movement of the shearing mechanism, or the tow guide roller and the gripping shoe.

The method may further include receiving a signal from a sensor, the signal being indicative of lateral slip of the tow material.

Another aspect provides a computer readable medium having instructions stored thereon which, when executed, cause the operation of the control method as above.

Embodiments are described, by way of example only, with reference to the accompanying drawings, in which:

FIG. 16 shows a schematic representation of a tape laying head of some embodiments;

FIGS. 19-21 show schematic representations of a tape laying head of some embodiments with a slip compensation mechanism.

Figure 2:
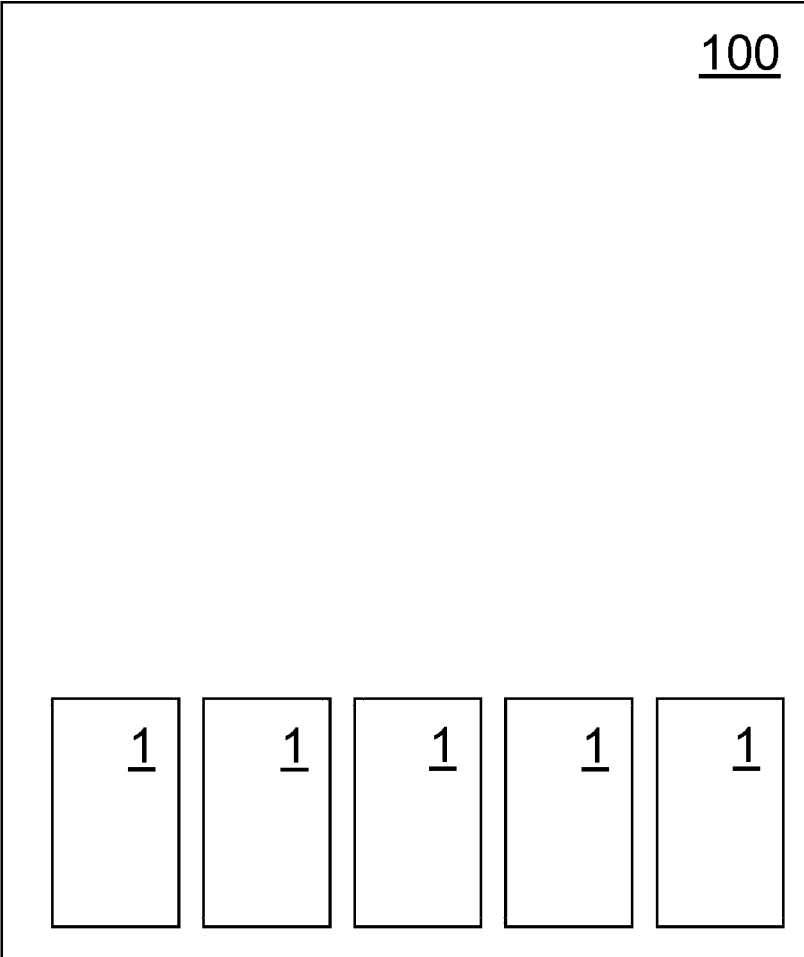
FIG. 2 shows a schematic representation of a tape laying system of some embodiments.
Figure 3:
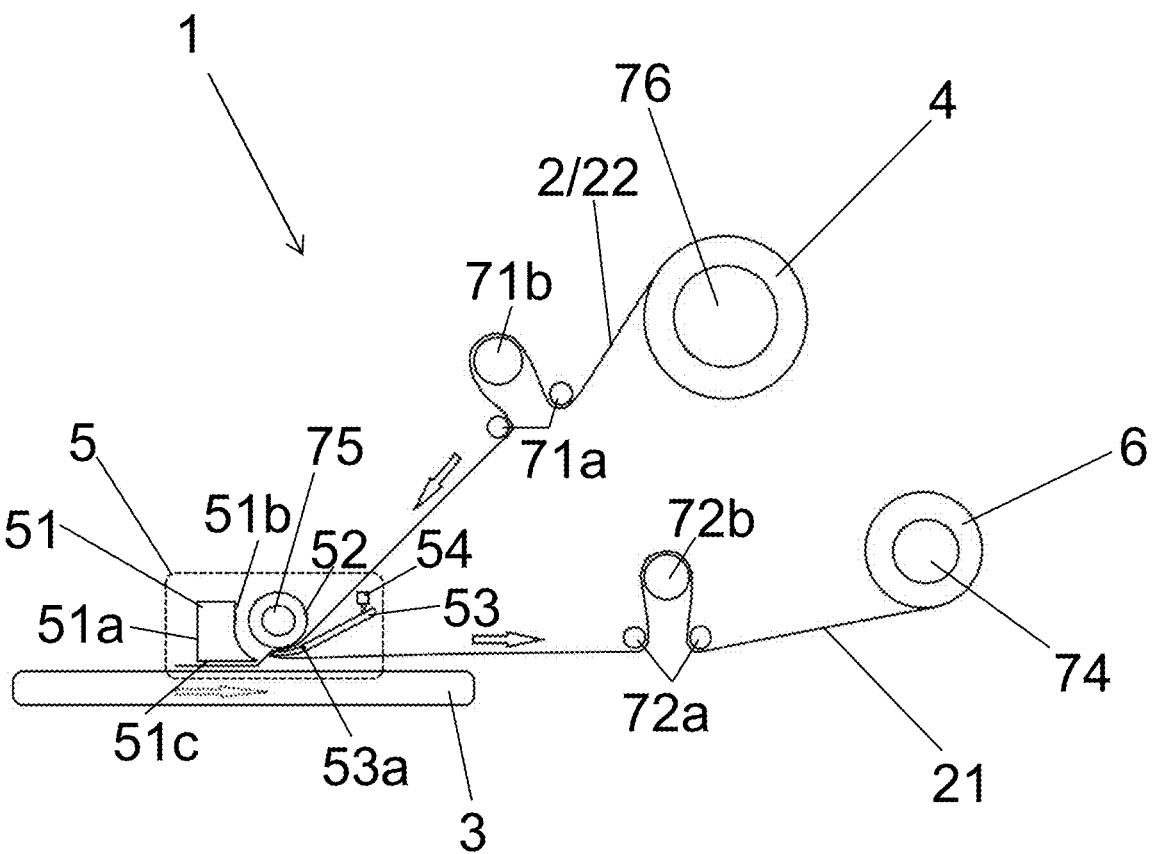
FIG. 3 shows a schematic representation of a tape laying head of some embodiments.

Embodiments include a tape laying head 1—see FIGS. 2 and 3, for example. The tape laying head 1 is configured to lay a tape 2 on a mould 3. The tape laying head 1 may be a part of a tape laying system 100 and some embodiments include the tape laying system 100—which may, for example, include a plurality of the tape laying heads 1 as described herein.

The tape laying head 1 may be configured to lay the tape 2 on the mould 3 as part of the construction of a composite structure, for example.

The tape laying system 100 is configured to move the or each tape laying head 1 across the mould 3—e.g. using a robotic arm or gantry. The or each tape laying head 1 is configured to lay the tape 2 onto the mould as the mould 3 is traversed by the or each tape laying head 1. In some embodiments, the tape laying system 100 is configured to move the or each tape laying head 1 across a substantially stationary mould 3 but, equally, the tape laying system 100 may be configured to move the mould 3 relative to the one or more tape laying heads 1 which are substantially stationary (or to move both the mould 3 and the or each tape laying head 1). In any event, the tape laying system 100 may be configured to move the or each tape laying head 1 relative to the mould 3, however this may be achieved.

The tape laying head 1 is configured to receive tape 2 from a tape supply 4 for laying on the mould 3. The tape supply 4 may form part of the tape laying head 1 or may be part of the wider tape laying system 100, for example.

The tape 2 from the tape supply 4 is configured to be delivered, by the tape laying head 1, to a shearing mechanism 5. The shearing mechanism 5 is configured to receive the tape 2 from the tape supply 4 and to lay the tape 2 onto the mould 3.

In some embodiments, the tape 2 provided by the tape supply may have a backing material 21 and a tow material 22, with the backing material 21 supporting the tow material 22 (e.g. as the tape 2 is delivered from the tape supply 4 to or towards the shearing mechanism 5). The tow material 22 is to be laid on the mould 3 and the backing material 21 may be for discarding, for example. The tow material 22 may include one or more reinforcement fibres and is described in more detail herein. In some embodiments, the backing material 21 provides a binding or resin material which may combined with the one or more reinforcement fibres to from the tow material 22. The binding or resin material may be provided as a layer on the backing material 21, for example.

At or in the region of the shearing mechanism 5, the backing material 21 may be removed from the tow material 22. This may occur before or as the tow material is laid onto the mould 3. A heater (not shown) may be provided to heat the tow material 22 and, in particular, the binder or resin material. The heater may be provided in the path of the tow material 22, upstream of the shearing mechanism 5, for example.

The tow laying head 1 may be configured to deliver the backing material 21, once separated from the tow material 22, to a backing material collector 6. The backing material collector 6 may be configured to collect the backing material 21 for later disposal (which may include recycling, for example). The backing material collector 6 may form part of the tape laying head 1 or may be part of the wider tape laying system 100, for example.

Figure 1:
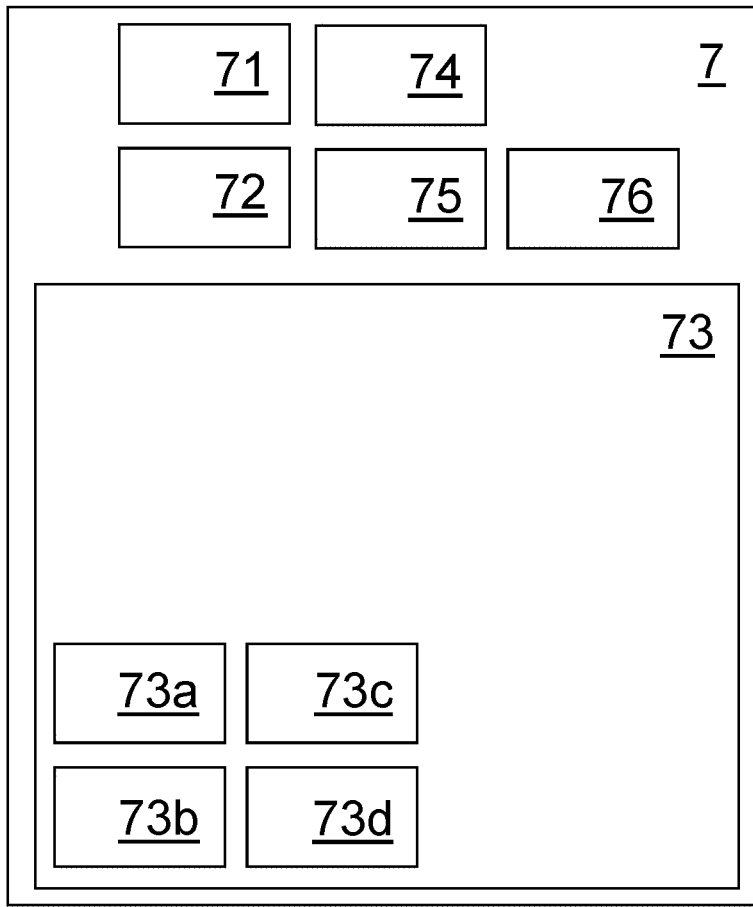
FIG. 1 shows a schematic representation of a tension control system of some embodiments.

In operation, therefore, tape 2 may pass from the tape supply 4 to the shearing mechanism 5—see the solid line arrows in FIG. 1 for the direction of travel of the tape 2 and/or backing material 21. At or in the region of the shearing mechanism 5, the backing material 21 of the tape 2 may be separated from the tow material 22. The shearing mechanism 5 may apply the tow material 22 to the mould 3 (the broken line arrow in FIG. shows the direction of travel of the shearing mechanism 5 with respect to the mould 3) and the backing material 21 may be delivered to the backing material collector 6, for collection. All or some of these operations may be performed as part of the operation of the tape laying head 1 but, as described, some parts (such as the tape supply 4 and/or backing material collector 6) may be part of the wider tape laying system 100—so the delivery and/or collection operations may be operations performed by the wider tape laying system 100, as the case may be.

Embodiments include a tension control system 7—see FIGS. 1 and 3, for example. The tension control system 7 is configured to control a tension of the tow material 22 in a stage immediately prior to its laying on the mould 3. In other words, the tension control system 7 may be configured to control the tension of the tow material 22 in the shearing mechanism 5.

Tape

The tape 2 as described includes a backing material 21 and tow material 22. The backing material 21 may be a paper-based backing material 21, for example. The backing material 21 may be configured to support the tow material 22 prior to laying of the tow material 22 on the mould 3, for example. The backing material 21 may also be configured to aid the storage of the tape 2 such that the tape 2 may be wound around a bobbin 41 (e.g. of the tape supply 4—see FIG. 10, for example).

The tow material 22 could take a number of different forms but includes one or more reinforcement fibres 22*a* (see FIG. 4, for example) which may be carbon fibres or glass fibres, for example. The reinforcement fibres 22*a* may be elongate fibres and may be in a woven or unwoven configuration in the tow material 22. The reinforcement fibres 22*a*, if a plurality are provided, may be provided in one or more bundles known as tows 22*b*.

The tow material 22 may include a binder material. The binder material may be configured to help to retain the relative arrangement of the reinforcement fibres 22*a* with respect to each other and/or to help to adhere the tow material 22 to the mould 3 (or other layers of tow material 22 already laid on the mould 3), for example. The binder material may be inadequate as a resin material for use in formation of a composite structure from the tow material 22. Therefore, the tow material 22 may be configured for and/or intended to be impregnated with a thermosetting resin material—e.g. after laying of the tow material 22 on the mould 3. Such tow material 22 may be described as dry tow material 22 due to the absence of adequate resin material in its supplied form.

The tow material 22 may be a pre-impregnated tow material 22. The pre-impregnated tow material 22 includes—in its supplied form—adequate resin material (i.e. thermosetting resin material) to form the composite structure from the tow material 22. Therefore, there is no need to apply further thermosetting resin material, for example. The pre-impregnated tow material 22, therefore, includes the one or more reinforcement fibres 22*a* and a resin material. The resin material may also be called a matrix material and could take other forms.

Pre-impregnated tow material 22 tends to have higher shear stiffness than dry tow material 22.

In some embodiments, the tow material 22 is provided in two parts: the one or more reinforcement fibres and the binder or resin material. The two parts may be combined in the tape laying head 1 or in the wider tape laying system 100, for example. The binder or resin material may be provided on the backing material 21 for example.

In some embodiments, an endless backing material 21 may be provided (as part of the tape laying head 1), which serves the same purpose as the backing material 21 described herein with respect to supporting the tow material 22 (but not in relation to the storage of the tow material 22 or the provision of binding or resin material). The tow material 22 may be provided, therefore, from the tape supply 4 to the endless backing material 21 within the tape laying head 1, in such embodiments. In these embodiments, references to the tape 2 in relation to the tape supply 4 are references to the tow material 22 (e.g. such that the tow material 22 may be provided on a bobbin 41).

Embodiments are described in relation to tape 2 which includes the backing material 21 in its supplied form but it should be understood that the same applies to embodiments in which the backing material 21 is in the form of an endless backing material 21 provided in the tape laying head 1 or embodiments in which the tow material 22 is added to the resin material in the tape laying head 1 or in the wider tape laying system 100.

Generally, as used herein references to a tape 2 may be interpreted as references to one or more tows (each of which may comprise one or more reinforcement fibres 22*a*). Therefore, references to a tape 2 may be references to a tow and the terms are not used herein to any distinctive effect unless otherwise stated.

Tape Supply

The tape supply 4 may include a bobbin 41 about which the tape 2 may be wound. The tape supply 4 may include a creel 42 which may be configured to receive and support the bobbin 41 (see FIG. 10, for example). In some embodiments there is a plurality of bobbins 41 and each of the bobbins 41 is received and supported by the creel 42.

As described, the tape supply 4 may form part of the tape laying head 1 or part of the wider tape laying system 100.

The tape supply 4 may be configured to supply tape 2 to the shearing mechanism 5 and, as such, a tape path may be defined between the tape supply and the shearing mechanism 5. This tape path may be formed, at least in part, by the tape laying head 1. One or more parts of this tape path may be defined by a tube through which the tape 2 may pass, for example.

In some embodiments, the tape supply 4 is configured to supply tape 2 to a plurality of tape laying heads 1 of the tape laying system 100 (e.g. in embodiments in which there are multiple tape laying heads 1 as part of the tape laying system 100). The tape supply 4 may, therefore, include at least one bobbin 41 for each tape laying head 1—such that separate tapes (or tows) 2 may be supplied to each tape laying head 1. In some embodiments, more than one tape (or tow) 2 is supplied, in parallel, to a single (i.e. one and only one) tape laying head 1 (and there may be multiple such tape laying heads 1 which each receive multiple tapes 2 from the tape supply 4 in parallel).

The or each bobbin 41 may be removable such that the tape supply 4 may include a creel 42 configured to receive one or more bobbins 41. The tape supply 4 may at least partially define one or more tape paths through which tape 2 is configured to pass towards the shearing mechanism 5 (or mechanisms 5, as the case may be).

The tape 2 supplied by the tape supply 4 may be any tape 2 as described herein. Therefore, in some embodiments, this tape 2 may include a tow material 22 and a backing material 21. In some embodiments, the tape 2 supplied by the tape supply 4 includes the tow material 22 but the backing material 21 is provided separately—e.g. as an endless loop. The tow supply 4 may be configured to pass the tow material 22 in some such embodiments to the backing material 21—e.g. the endless loop. In some embodiments, that endless loop may be considered to be part of the tape supply 4. In some embodiments, the endless loop may be part of the tape laying head 1, for example.

Shearing Mechanism

The shearing mechanism 5 may be a mechanism generally as described in GB2492594.

The shearing mechanism 5 may include a compaction shoe 51 which is configured to press the tow material onto the mould 3 (herein it will be appreciated that references to the laying of material, such as the tow material 22, on the mould 3 include the indirect laying of the material on the mould 3 (for example, the laying of material on a layer of material already laid on the mould 3).

The compaction shoe 51 may have a first side 51a which opposes a second side 51b across a width of the compaction shoe 51. The first side 51a may have a generally flat or planar surface, as depicted, or could have a surface of a different form. At a base of the first side 51a (which may also be at a base of the compaction shoe 51) there may be a substantially straight trailing edge of the compaction shoe 51. The trailing edge delineates the first side 51a of the compaction shoe 51 and a compaction side 51c of the compaction shoe 51. The compaction side 51c includes a compaction surface 51c and the terms are used synonymously herein.

The compaction surface 51c is configured to press the tow material 22 against the mould 3. The compaction surface 51c may be configured to permit the tow material 22 to pass between the compaction shoe 51 and the mould 3 as the compaction shoe 51 (and the tape laying head 1, for example) moves across the mould 3 to lay the tow material 22. The compaction surface 51c may be a substantially smooth surface and may have a relatively low coefficient of fiction to enable the compaction shoe 51 to slide over the laid tow material 22.

The trailing edge of the compaction shoe 51 represents the final part of the compaction shoe 51 which presses the tow material 22 against the mould 3 as the compaction shoe 51 moves with respect to the mould during a normal laying operation. This might also be called, therefore, the rear edge of the compaction shoe 51 or, more specifically, the rear edge of the compaction surface 51c (with rear (and front) defined by virtue of the direction of travel of the compaction shoe 51 with respect to the mould 3).

The compaction shoe 51 may also include a leading edge. The leading edge may oppose the trailing edge across a width of the compaction shoe 51 (and that width may be at the base of the compaction shoe 51). The leading edge may delineate between the second side 51b of the compaction shoe 51 and the compaction side 51c of the compaction shoe 51.

The leading edge of the compaction shoe 51 represents the first part of the compaction shoe 51 which presses the tow material 22 against the mould 3 as the compaction shoe 51 moves with respect to the mould during a normal laying operation (this may be a shear boundary as described herein). This might also be called, therefore, the front edge of the compaction shoe 51 or, more specifically, the front edge of the compaction surface 51c (again, with front (and rear) defined by virtue of the direction of travel of the compaction shoe 51 with respect to the mould 3).

In some embodiments, the trailing edge may be a relatively sharp edge—in that the first side 51a may meet the compaction side 51c along a thin edge (i.e. with a relatively small radius). In some embodiments, the leading edge may be a relatively rounded edge—in that the second side 51b may meet the compaction side 51c along a curved edge (in cross-section) with a relatively large radius (compared to the aforementioned thin edge).

The trailing and leading edges may both be substantially straight edges. In other words, the two edges may extend along substantially straight axes, respectively. The leading and trailing edges may be substantially parallel with respect to each other (i.e. the substantially straight axes may be substantially parallel to each other).

The second side 51b may have a curved surface, e.g. as depicted, or could have a surface of a different form. In some embodiments, the second side 51b, e.g. as depicted, may have both generally flat and generally curved parts.

The second side 51b may be configured (e.g. shaped and sized) to receive—at least partially—a tow guide roller 52. The tow guide roller 52 may, therefore, be part of the shearing mechanism 51 and may be located adjacent the compaction shoe 51. In particular, the tow guide roller 52 may be located adjacent the second side 51b of the compaction shoe 51.

The tow guide roller 52 may be located such that the tow material 22 may pass a portion of the tow guide roller 52 adjacent the compaction shoe 51 prior to that tow material 22 reaching the compaction shoe 51. In other words, the tow guide roller 52 may be located upstream of the compaction shoe 51 in terms of the path of the tow material 22 through the shearing mechanism 5.

It should be appreciated that the tow material 22 has a path of travel from the tape supply 4 to the shearing mechanism 5 and that this path is formed from various parts through the tape laying head 1. The tow material path may—in places—be the same as the tape path and the terms may be synonymous. However, typically the tape path is a reference to the path of the tape 2 (i.e. of the tow material 22 and the backing material 21, if provided) whereas the tow material path may or may not be a path for the backing material too. The paths (tow material or tape) have an upstream and a downstream direction which are defined by the normal direction of travel of the tow material 22 or tape 2, as the case may be, during a laying operation—i.e. generally from the tape supply 4 towards the shearing mechanism 5 (and, in particular, towards the compaction shoe 51).

The tow guide roller 52 may be may be configured to rotate about an axis which is generally parallel with the leading edge of the compaction shoe 51. The tow guide roller 52 may have an outer surface made from silicone, in some embodiments.

The shearing mechanism 5 may include a gripping shoe 53 (which may also be called a tow feed shoe, for example). The gripping shoe 53 may be located adjacent the tow guide roller 52 such that the tow material may pass between the gripping shoe 53 and the tow guide roller 52. In other words, at least part of the tow material path (and, in some instances, the tape path) may be defined between the tow guide roller 52 and the gripping shoe 53.

The gripping shoe 53 may be formed from a generally elongate member which is pivotably mounted with respect to the tow guide roller 52 such that a distance between at least part of the gripping shoe 53 and at least part of the tow guide roller 52 may be varied by rotation of the gipping shoe 53 about its pivotable mount 53*a* (the pivotable mount 53*a* may form part of the shearing mechanism 5). As depicted, for example, the gripping shoe 53 may have a distal end adjacent the tow guide roller 52 and a proximal end (which opposes the distal end). The pivotable mount 53*a* may be located between the proximal and distal ends of the gripping shoe 53.

The distal end of the gripping shoe 53 may be shaped to increase a surface area over which the tow material 22 (or tape 2) may be pinched between the tow guide roller 52 and the gripping shoe 53. Accordingly the distal end of the gipping shoe 53 may be curved and the degree of curvature may generally match the circumferential shape of at least part of the tow guide roller 52.

Rotational movement of the gripping shoe 53 about the pivotable mount 53*a* may vary a distance between at least part of the gripping shoe 53 (e.g. part of the distal end thereof) and the tow guide roller 52. Rotational movement of the gripping shoe 53 about the pivotable mount 53*a* may vary a force applied to tow material or a tape 2 between at least part of the gripping shoe 53 (e.g. part of the distal end thereof) and the tow guide roller 52 (this force may be a compressive force or, in other words, a gripping or pinching force).

The gripping shoe 53 may include a resilient biasing arrangement 54—such as a spring which may be a helically wound spring, for example—which is configured to bias the distal end of the gripping shoe 53 towards the to guide roller 52. In some embodiments, the resilient biasing arrangement 54 includes a pneumatic or hydraulic ram.

Accordingly, the tow material 22 may follow a tow material path between the tow guide roller 52 and the gripping shoe 53 (in a gripping zone), before passing to the compaction shoe 51, which may press the tow material 22 onto the mould 3 (i.e. may lay the tow material 22 onto the mould 3), in a pressing zone.

In some embodiments, the tow material 22 may be accompanied by the backing material 21 though the path between the tow guide roller 52 and the gripping shoe 53 (i.e. in the gripping zone). As such this part of the path may be described as a tape path as well. As the tape 2 leaves the path defined between the tow guide roller 52 and the gripping shoe 53, the backing material 21 may be removed from the tow material 22. In other words, as the tape 2 leaves the gripping zone, the backing material 21 may be separated from the tow material 22. The backing material 21 may, in some embodiments (such as those depicted) pass around an extreme distal end of the gripping shoe 53.

The extreme distal end of the gipping shoe 53 may be the extreme part of the distal end, thereof. The extreme distal end of the gripping shoe 53 may be sized and/or shaped (e.g.

may have a suitable radius) to aid in separation of the backing material 21 from the tow material 22.

The backing material 21 may, therefore, follow a backing material path from the gripping shoe 53. This path may extend to or towards the backing material collector 6, which may be downstream (with respect to the path and the normal direction of movement of the backing material 21) of the shearing mechanism 5.

The last part of the gripping shoe 53 which the tow material 22 contacts (on its way towards the compaction shoe 51) will be referred to as the gripping edge in some embodiments and may be an linear portion of the gripping shoe 53 which may extend parallel to the leading edge of the compaction shoe 51—this edge may be a shearing boundary as described herein.

As will be understood, the shearing mechanism 5 may be configured to move with respect to the mould 3 in a first direction. The first direction may be a laying direction, for example, and is generally from left to right in the depicted example of FIG. 3.

The shearing mechanism 5 may further be configured to move with respect to the mould 3 in a second direction, the second direction being generally perpendicular to the first direction (e.g. into and out of the page in the depicted example of FIG. 3). This second direction may be a shearing direction and is intended to subject the tow material 22 to shear deformation. As will be appreciated, this second direction may be a direction parallel to the trailing edge, the leading edge, and/or the axis of rotation of the tow guide roller 52.

Movement of the shearing mechanism 5 in the first direction may be driven by the tape laying head 1 moving relative to the mould 3 in the first direction. Movement of the tape laying head 1 in the first direction relative to the mould 3 may be driven by movement of a part of the tape laying system 100 to which the tape laying head 1 is mounted (relative to the mould 3). The tape laying system 100 may, to this end, include a gantry to which the tape laying head 1 is mounted (the same gantry may have a plurality of tape laying heads 1 mounted thereto).

Movement of the shearing mechanism 5 in the second direction may be driven by the tape laying head 1 moving relative to the mould 3 in the second direction. Movement of the tape laying head 1 in the second direction relative to the mould 3 may be driven by movement of a part of the tape laying system 100 (such as the gantry) to which the tape laying head 1 is mounted (relative to the mould 3). In some embodiments, movement of the shearing mechanism 5 in the second direction may be driven movement of the shearing mechanism 5 with respect to the tape laying head 1 in the second direction.

Accordingly, the shearing mechanism 5 may be configured to provide shear deformation of the tow material 22—referred to as tow steering or shear tow steering, for example. In some embodiments, the shearing mechanism 5 may take a different form. For example, the compaction shoe 51 may be in the form of a roller. Similarly, the gripping shoe 53 may likewise be in the form of a roller, for example. In any event, the shearing mechanism 5 may provide a pair of shearing boundaries.

The Backing Material Collector

Figures 10, 11:
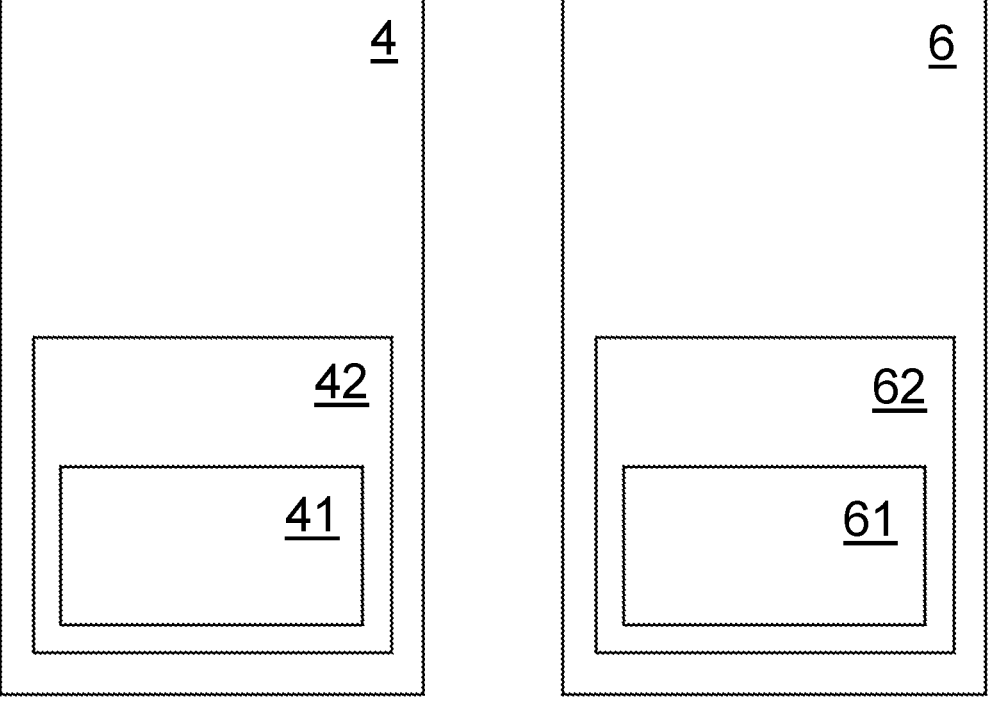
FIG. 10 shows a schematic representation of a tape supply of some embodiments.
FIG. 11 shows a schematic representation of a backing material collector of some embodiments.

The backing material collector 6 may include a bobbin 61 (which to distinguish this bobbin 61 from the bobbin 41 may be referred to as a collection bobbin 61, with the other bobbin 41 referred to as a supply bobbin 41, for instance)—see FIG. 11, for example. The collection bobbin 61 may be configured to receive and collect the backing material 21 following separation from the tow material 22. In other words, the used backing material 21 may be wound around the collection bobbin 61 during operation of the tape laying head and/or system 100.

The backing material collector 6 may include a creel 62 which may be configured to receive and support the collection bobbin 61. In some embodiments there is a plurality of collection bobbins 61 and each of the collection bobbins 61 is received and supported by the creel 62. The creel 62 may be a separate creel 62 to that of the tape supply 4 and so may be called a collection creel 62 (with the other creel 42 referred to as a supply creel 42). In some embodiments, however, the creel is shared such that the supply creel 42 and the collection creel 62 are the same creel (i.e. the same creel structure).

As described, the backing material collector 6 may form part of the tape laying head 1 or part of the wider tape laying system 100.

The backing material collector 6 may be configured to receive backing material 21 from the shearing mechanism 5 and, as such, a backing material path may be defined between the shearing mechanism 5 and the backing material collector 6. This backing material path may be formed, at least in part, by the tape laying head 1. One or more parts of this backing material path may be defined by a tube through which the backing material 21 may pass, for example.

In some embodiments, the backing material collector 6 is configured to receive backing material 21 from a plurality of tape laying heads 1 of the tape laying system 100 (e.g. in embodiments in which there are multiple tape laying heads 1 as part of the tape laying system 100). The backing material collector 6 may, therefore, include at least one bobbin 61 for each tape laying head 1—such that separate backing material may be received from each tape laying head 1. In some embodiments, more than one strip of backing material 2 is received, in parallel, from a single (i.e. one and only one) tape laying head 1 (and there may be multiple such tape laying heads 1 which each provide multiple strips of backing material 21 from the backing material collector 6 in parallel).

The or each bobbin 61 may be removable such that the backing material collector 6 may include a creel 62 configured to receive one or more bobbins 61. The backing material collector 6 may at least partially define one or more backing material paths through which backing material 21 is configured to pass towards the backing material collector 6 (or collectors 6, as the case may be).

In embodiments in which the backing material 21 is an endless loop, the backing material path may pass from the shearing mechanism 5 to the backing material collector 6 and then back to the shearing mechanism (at the shearing mechanism 5, that path may pass between the tow guide roller 52 and the gripping shoe 53 as described in relation to the embodiments in which the backing material 21 is part of the tape 2 and not an endless loop).

Tension Control System

It has been found that control of the tension of the tow material 22 at the shear mechanism 5 is important to promote more ideal shear deformation of the tow material 22. In particular, the tension of the tow material 22 between the gripping zone and the pressing zone (which may be between the gripping edge of the gripping shoe 53 and the leading edge of the compaction shoe 51—i.e. between the shearing boundaries).

As described, the tow material 22 may include one or more reinforcement fibres 22a. By way of an explanation embodiments are considered in which the tow material 22 includes a plurality of reinforcement fibres 22a wherein at least some of those fibres are arranged in parallel lines along a length of the tow material 22 (that length generally being along the tow material path)—see FIG. 4, for example.

Figure 4:
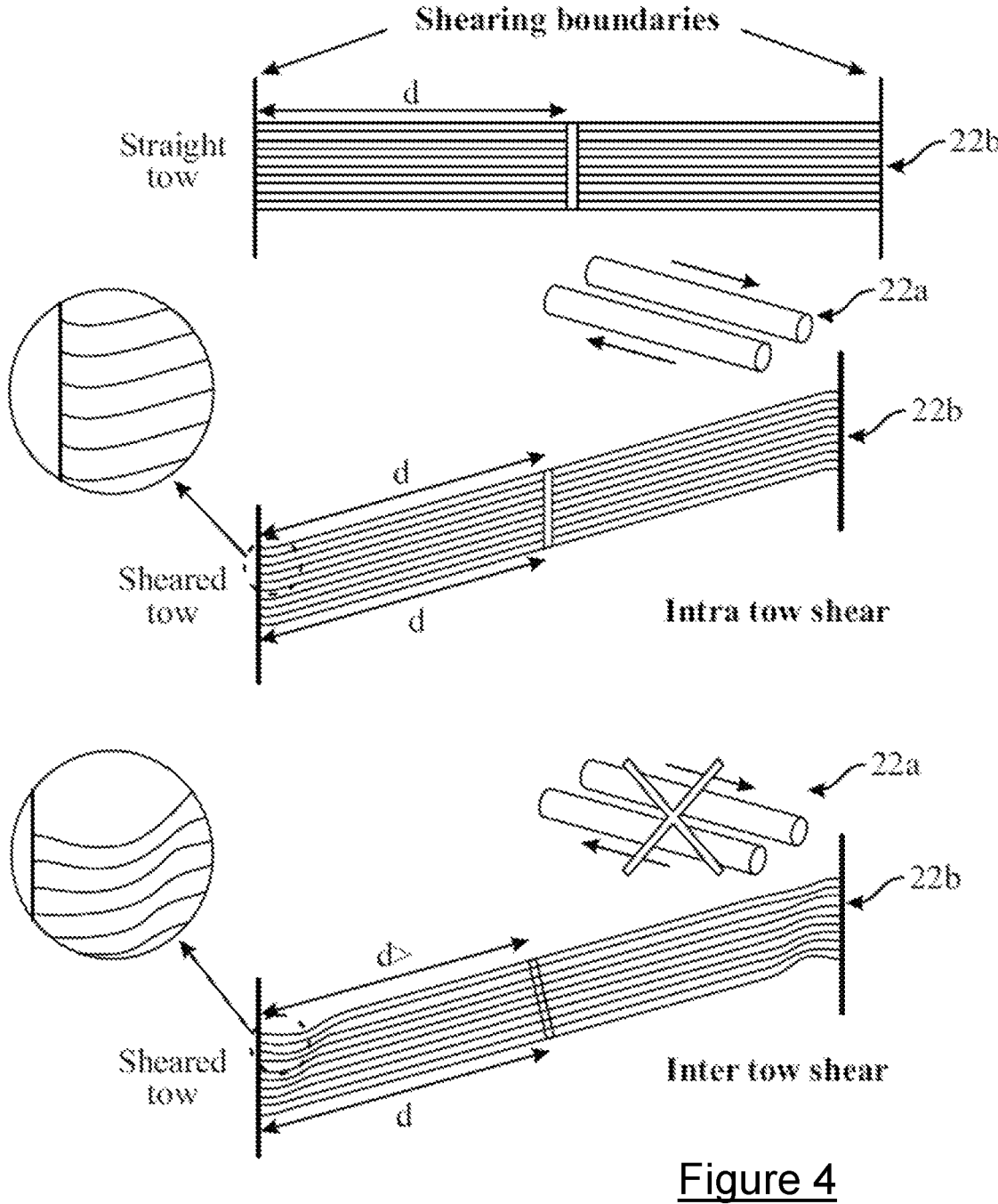
FIG. 4 shows a schematic explanation of intra and inter tow material shear.

Ideally, shear deformation, applied through the use of the shear mechanism 5, causes shear deformation of all of the reinforcement fibres 22a across a width of the tow material 22—intra tow shear deformation (see FIG. 4). This shear deformation would ideally be substantially uniform. This requires sliding of the reinforcement fibres 22a within the tow material 22 with respect to each other.

However, in practice, however, such slippage does not readily occur uniformly between the reinforcement fibres of the tow material 22 and inter tow shear occurs—see FIG. 4. This causes localised buckling or wrinkling (or other defects) to occur. These defects will typically occur adjacent the boundaries of the shear deformation (which are defined by the gripping and compaction zones as described herein, i.e. the shear boundaries).

In addition, slippage causes the laid tow material 22 to be misaligned with the intended laid tow material path on the mould 3.

It has been determined that control of the tension of the tow material 22 between the compaction and gripping zones (i.e. between the shear boundaries) can reduce the risk of such defects occurring. In particular, applying tension while shearing the tow material 22, forces the tow material 22 to deform in intra tow shear, which is the preferred mode of shear deformation (to give optimum quality).

Therefore, embodiments include the tension control system 7 which is configured to control this tension during operation of the tape laying head 1.

The tension control system 7 may include a first load sensor 71 and a second load sensor 72—see FIGS. 1 and 3. The first and second load sensors 71,72 are communicatively coupled to a controller 73 of the tension control system 7.

The controller 73 may include one or more processors 73a, a memory 73b, a computer readable medium 73c, and an input/output interface 73d, all of which may be communicatively coupled together to form the controller 73.

The first and second load sensors 71 may be communicatively coupled to the input/output interface 73d of the controller 73. The controller 73 may be configured, therefore, to receive a first load sensor signal from the first load sensor 71 and to receive a second load sensor signal from the second load sensor 72. These signals may be received at the input/output interface 73d, for example.

The first load sensor signal may be a signal indicative of a load sensed by the first load sensor 71. The second load sensor signal may be a signal indicative of a load sensed by the second load sensor 72.

The first load sensor 71 may be configured to sense a tension of the tow material 22 upstream in the tow material path of the shearing mechanism 5. The first load sensor signal may, therefore, be a signal indicative of the tension of the tow material 22 between the tape supply 4 and the shearing mechanism 5. As will be understood from the discussion herein, this tension of the tow material 22 may be a tension of the tape 2 (including the tow material 22 and the backing material 21, for example).

The second load sensor 72 may be configured to sense a tension of the backing material 71 downstream in the backing material path of the shearing mechanism 5. The second load sensor signal may, therefore, be a signal indicative of the tension of the backing material 21 between the shearing mechanism 5 and the backing material collector 6.

In other words, the first and second load sensor signals are indicative of the tension, in the tow material 22 and backing material 21 respectively, either side of the shearing mechanism 51 in terms of the paths of these materials. These may likewise be viewed as an input tension (in relation to the tension indicated by the first load sensor signal) and an output tension (in relation to the tension indicated by the second load sensor signal).

The first and second load sensors 71, 72 may take a number of different forms. In some embodiments, the first and second load sensors 71, 72 each include a respective pair of slave rollers 71*a*, 72*a*. There may, therefore, be a first pair of slave rollers 71*a* of the first load sensor 71. There may be a second pair of slave rollers 72*a* of the second load sensor 72.

Each slave roller of the first pair of slave rollers 71*a* may be configured to rotate around respective axes which may be generally parallel with each other and which may be perpendicular to the direction of travel of the tow material 22.

Each slave roller of the second pair of slave rollers 72*a* may be configured to rotate around respective axes which may be generally parallel with each other and which may be perpendicular to the direction of travel of the backing material 21.

The first slave roller pair 71*a* may be located on one side of the tow material 22 (which may be the tape 2). The first load sensor 71 may include a first load cell 71*b* which may be offset from the first slave roller pair 71*a* and which may be located on the other side of the tow material 22 to the first slave roller pair 71*a*. The tow material path may pass at least partially around one of the rollers of the first slave roller pair 71*a*, around the first load cell 71*b*, and then at least partially around the other of the rollers of the first slave roller pair 71*a*.

The first load cell 71*b* may be in the form of a roller mounted on an axle, wherein a load cell member is associated with the axle to measure a force on the axle, for example.

The second slave roller pair 72*a* may be located on one side of the backing material 21. The second load sensor 72 may include a second load cell 72*b* which may be offset from the second slave roller pair 72*a* and which may be located on the other side of the backing material 21 to the second slave roller pair 72*a*. The backing material path may pass at least partially around one of the rollers of the second slave roller pair 72*a*, around the second load cell 72*b*, and then at least partially around the other of the rollers of the second slave roller pair 72*a*.

The second load cell 72*b* may be in the form of a roller mounted on an axle, wherein a load cell member is associated with the axle to measure a force on the axle, for example.

The tension control system 7 may include a first motor 74 associated with the backing material collector 6, a second motor 75 associated with the shearing mechanism 5, and a brake 76 associated with the tape supply 4.

The first motor 74 may be configured to drive rotation of the collection bobbin 61. This may be achieved, for example, by driving rotation (directly or indirectly) of at least part of the creel 62 to which the collection bobbin 61 is mountable or mounted. Indirect driving may include one or more gears, for example.

The first motor 74 may be communicatively coupled to the controller 73 and may, therefore, be communicatively coupled to the input/output interface 73*d*. The first motor 74 may be configured to receive a first motor control signal from the controller 73 via the communicatively coupling. The first motor control signal may control the operation of the first motor 74.

The second motor 75 may be configured to drive rotation of the tow guide roller 52. This may be achieved, for example, by driving rotation (directly or indirectly) of a spindle on which the tow guide roller 52 may be mounted (the spindle being part of the shearing mechanism 5). Indirect driving may include one or more gears, for example.

The second motor 75 may be communicatively coupled to the controller 73 and may, therefore, be communicatively coupled to the input/output interface 73*d*. The second motor 75 may be configured to receive a second motor control signal from the controller 73 via the communicatively coupling. The second motor control signal may control the operation of the second motor 75.

In some embodiments, there is no motor associated with the tape supply 4 (or no motor which is configured to drive rotation of the tape supply 4 in the delivery of tow material 22 or tape 2). The tape supply 4 may be regarded as passively operated in such embodiments, as the tape 2 or tow material 22 may be drawn from the tape supply 4 by other parts of the tape laying head 1 (such as through the operation of the first and/or second motors 74,75, for example).

The brake 76 may be configured to apply a braking force, such as a braking torque, to the tape supply 4—i.e. to brake or otherwise slow the supply of tow material 22 or tape 2 from the tape supply 4. For example, the brake 76 may be configured to apply a braking force to supply bobbin 41 in order to vary a speed of rotation of the supply bobbin 41. In order to achieve this, the brake 76 may be associated with the supply bobbin 41 and/or with the creel 42 to which the supply bobbin 41 is mounted and/or mountable.

The brake 76 could take a number of different forms. The brake 76 may be electronically actuated and so may be communicatively coupled to the controller 73 and configured to receive a brake signal from the controller 73. The brake 76 may, therefore, be communicatively coupled to the input/output interface 73*d*.

The brake 76 may be configured to apply, under the control of the brake signal, a varying braking force. Accordingly, a braking torque applied to the tape supply 4 (e.g. to the creel 42 and/or bobbin 41) may vary depending on the brake signal.

In some embodiments, the brake 76 is in the form of a magnetic brake. Accordingly, a part of the tape supply 4 which rotates as the tape 2 is dispensed therefrom (such as a part of the bobbin 41 or creel 42) may carry at least one first magnet, which may be a permanent magnet. The first magnet may form part of the brake 76. The brake 76 may include a second magnet which may be an electromagnet. The second magnet may be positioned within the magnet field of the first magnet and may be associated therewith. The second magnet may be secured against movement with the first magnet. In other words, the second magnet may be a substantially fixed magnet. The brake signal may be configured to alter the magnetic field generated by the second magnet with respect to the first magnet so as to apply or release the braking force. The brake 76 may be a motor, for example (this motor may be configured only to provide the braking force, however, and not to drive the supply of tow material 22 from the tape supply 4). As will be appreciated, different configurations of magnetic brake are possible—including embodiments in which the second and first magnets physically move with respect to each other dependent on the brake signal to alter the braking force. Other forms of brake are possible—including a mechanical brake in which, for example, a brake disc coupled for rotation with the bobbin 41 or creel 42 is selectively gripped between brake pads to apply the braking force (the gripping force being varied dependent on the brake signal). Other forms of friction brake are also envisaged as the brake 76.

The controller 73 may, therefore, be configured to receive the first and second load sensor signals. The controller 73 may be configured to output the first and second motor control signals and the brake signal.

The or each processor 73a may be configured to execute instructions and those instructions may be stored on the computer readable medium 73c. The execution of those instructions may cause the performance of one or more tension control operations, as described herein, in relation to the tape laying head 1. These tension control operations may include controlling the operation of the first motor 74, the second motor 75, and/or the brake 76.

The or each processor 73a may be communicatively coupled to the memory 73b and the or each processor 73a may use the memory 73b in the execution of the instructions. The memory 73b may be volatile memory, for example.

The controller 73 may be a shared controller which is also configured to control one or more other operations of the tape laying head 1 and/or the wider tape laying system 100. This may include, for example, the movement of the shear mechanism 5 with respect to the mould 3 (which may include the movement of the tape laying head 1 with respect to the mould 3, for example).

The controller 73 may be configured to receive one or more operational parameters. The or each operational parameter may be received from another part of the tape laying head 1 and/or from the tape laying system 100.

The one or more operational parameters may include, for example, a parameter representative of a characteristic of the operation of the tape laying head 1, a set point for the tension of the tow material 22 (i.e. a desired tow material tension 22 at the shearing mechanism 51 (such as between the compaction shoe 51 and the gripping shoe 53)), and/or a shear angle for the tow material 22 (i.e. a shear angle for the tow material 22 being laid on the mould 3—as described herein) and/or a speed of movement of the tape laying head 1 with respect to the mould 3.

The one or more operational parameters may be received via the input/output interface 73d, and may be provided to the or each processor 73a and/or stored in the memory 73b and/or stored on the computer readable medium 73c.

The controller 73 may be configured to use the or each received operational parameter in the performance of the or each tension control operation.

Tension Control

If tow material 22 were to be laid onto a mould 3 in a straight line using a conventional tape laying apparatus, there is an apparatus resistance force, $T_l$, which is the sum of the of all of the forces (e.g. frictional forces) which act on the tow material as it passes through the conventional tape laying head. These forces may include, for example, friction associated with a bobbin in a supply mechanism for the tow material, friction associated with any rollers about which the tow material passes, and friction associated with any surfaces within the head over which the tow material passes, for example.

During laying of the tow material 22 in a conventional apparatus, the head is moved with respect to the mould 3 and this provides a driving force, P.

Figure 5:
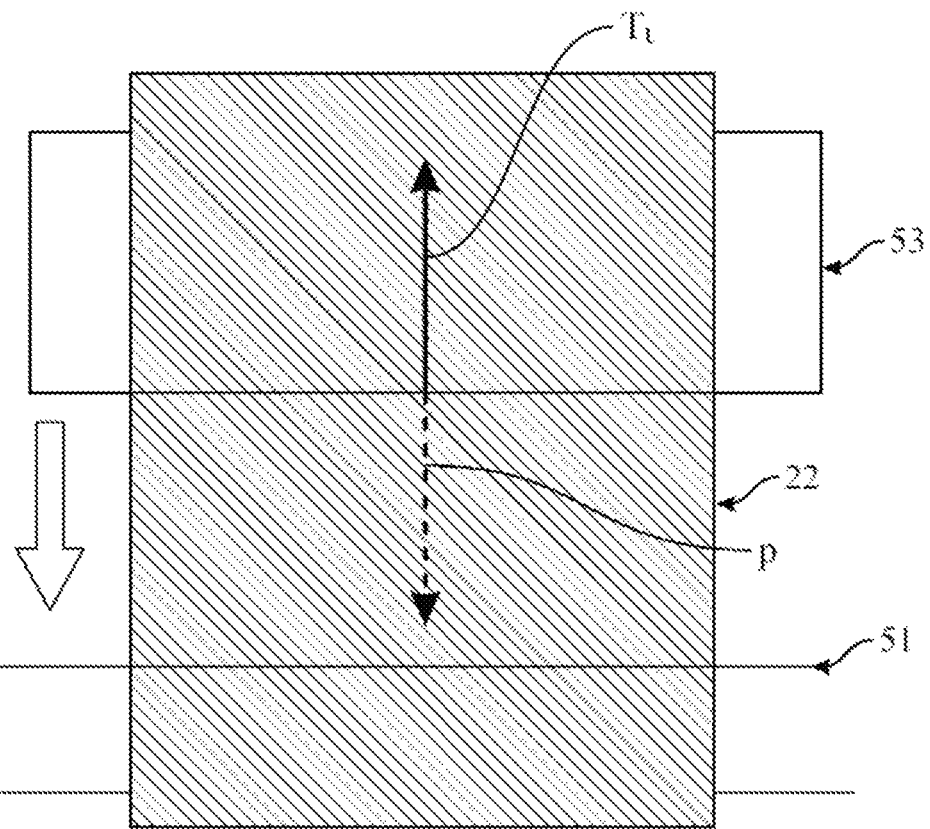
FIGS. 5-8 show schematic representations of part of the shearing mechanism with accompanying force vectors.

The apparatus resistance force, $T_l$, and the driving force, P, oppose each other and are parallel with each other (i.e.

they are aligned)—see FIG. 5. The driving force, P, also represents the tension in the tow material being laid.

If the apparatus resistance force, $T_l$, is equal to the driving force, P, then a constant laying speed (of the tow material 22 on the mould 3) is achieved—this is also the feed speed of the tow material 22).

In other words, if:

$$P = T_l$$

then a constant laying speed is achieved in this straight line laying of the tow material 22—also see FIG. 5 (in which the broken line arrow indicates the direction of movement of the tow material 22).

In a tape laying apparatus in which a shearing mechanism is provided (e.g. similar to the shearing mechanism 5 described herein) and used, then the driving force, P, is no longer aligned with the apparatus resistance force, $T_l$. In particular, the driving force, P, is angled with respect to the apparatus resistance force, $T_l$. The angle at which the driving force, P, acts with respect to the apparatus resistance force, $T_l$, is determined by the shear angle. The shear angle is the angle of the tow material 22 being laid with respect to a main travel direction of the head with respect to the mould 3 (i.e. a longitudinal direction). As will be appreciated the shearing mechanism operates by moving the head with respect to the mould 3 in a transverse direction (which is perpendicular to the longitudinal direction).

The driving force, P, in such instances may, therefore, be considered as having a longitudinal component, $P_l$, and a transverse component, $P_t$. Typically, regardless of the shear angle, the apparatus resistance force, $T_l$, remains substantially constant.

As such, at a constant laying speed:

$$P_l = T_l$$

Figure 6:
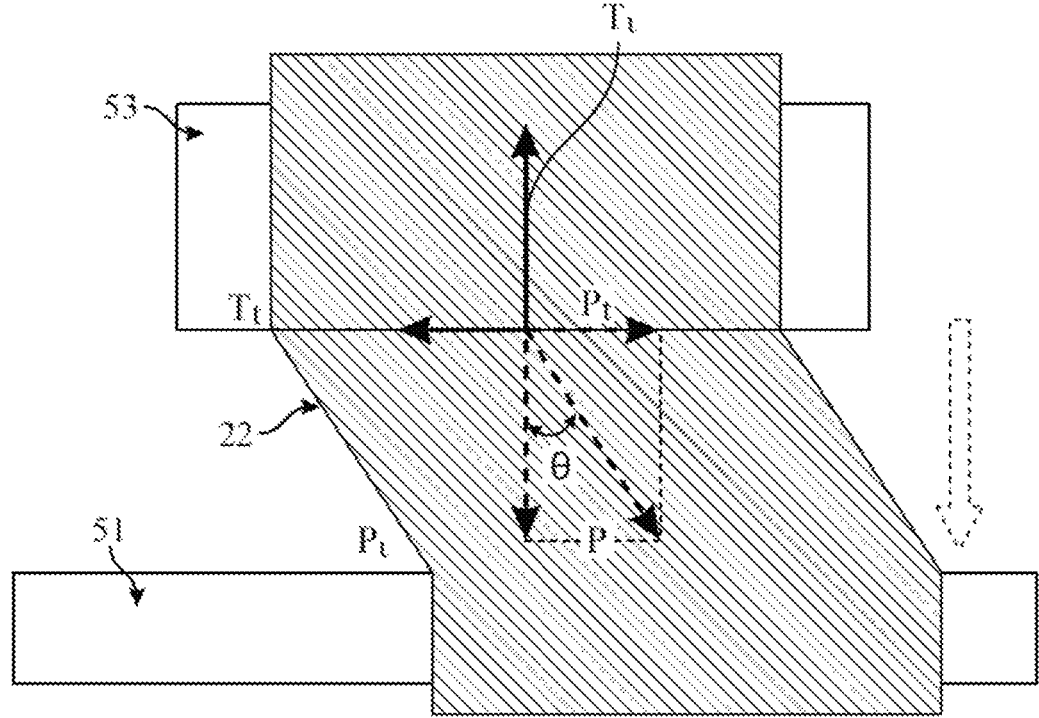

Therefore, as the shear angle increases, the magnitude of the driving force, P, increases and so the transverse component of this force increases as well:

$$P_t = P_l * \tan \theta$$

with θ being the shearing angle (see FIG. 6, for example, in which the broken line arrow indicates the direction of movement of the tow material 22).

In a shearing mechanism with a gripping shoe and tow guide roller (such as the shearing mechanism 5 described herein with its gripping shoe 53 and tow guide roller 52), the action of the gripping shoe and tow guide roller on the tow material 22 serves to resist lateral movement of the tow material across the gripping shoe. In other words, the action serves to inhibit slippage of the tow material 22 across the gripping shoe as the shear angle increases. The gripping shoe and tow guide roller, therefore, provide a transverse frictional force, $T_t$.

If the transverse component, $P_t$, of the driving force, P, remains less than the maximum transverse frictional force, $T_{t, max}$, then there is no lateral slippage of the tow material 22 across the gripping shoe.

Accordingly, if:

$$P \leq T_{t,max}$$

then there is no lateral slippage of the tow material 22 across the gripping shoe.

If slippage does occur then the tow material 22 will not follow the desired tow path—which is determined by the movement of the head with respect to the mould 3, which does assumes no slippage occurs. Indeed, eventually, the tow material 22 will reach an edge of the gripping shoe 53 and/or the tow guide roller 52 and will crush at that edge and/or jam the operation of the head.

Accordingly, in conventional apparatus with a shear mechanism, there is a limit in the shear angle which can be achieved and this limit is determined by the maximum transverse frictional force, $T_{t, max}$. The maximum transverse frictional force may be affected by parameters such as the coefficient of friction of the surface of the tow guide roller 52 and the pressure that is applied by the gripping shoe 53.

In many conventional apparatuses there is a design focus on minimising the tension of the tow material 22 at the point at which it is laid (i.e. at the point of deposition). This, in conventional apparatuses, may be sought by positively driving the supply of the tow material 22 (e.g. by over-feeding the tow material 22 to the shearing mechanism, if provided). In addition or alternatively, in conventional apparatus, this may be sought by minimising the total frictional forces on the tow material 22 through the apparatus and, in particular, the apparatus resistance force, $T_l$.

In an apparatus with a shearing mechanism similar to that described herein (i.e. the shearing mechanism 5) or that of GB2492594, a large part of the apparatus resistance force, $T_l$, is a result of the action of the gripping shoe 53 and tow guide roller 52 on the tow material 22. This is needed in order to provide the transverse frictional force, $T_t$.

In the apparatus of GB2492594, for example, the rate of supply of the tow material 22 is synchronised (mechanically, for example) to the rate of collection of the backing material 21. This synchronisation seeks to minimise the tension in the tow material 22. In order to account for varying lengths of delivery and collection of material 21,22 as the bobbins are depleted of tow material 22 or accumulate backing material 21, an electronic synchronisation may be implemented. However, such an electronic synchronisation has proven difficult to implement reliably in some instances—which can lead to laying failures, jamming of the head, and defects in the laid tow material 22. These issues may be exasperated with increased speed of laying operations, and increased frequency of stop-start cycles in a laying operation, for example. Such systems also fail to provide any mechanism by which the tension of the tow material 22 can be varied during a laying operation (and, in particular, a laying operation including shearing of the tow material 22).

Accordingly, the tension control system 7 of some embodiments seeks to introduce an additional force, $P_m$, into the operation of the head 1 (this additional force may also be referred to as a tensioning force or additional tensioning force). This additional force, $P_m$, may be a force which acts to pull the tow material 22 and/or the backing material 21, and so assists the feeding of the tow material 22.

During the laying of a straight line of tow material, therefore, the forces in accordance with the operation of the tension control system 7 may be expressed as (for a constant laying speed):

$$T_l = P + P_m$$

Figure 7:
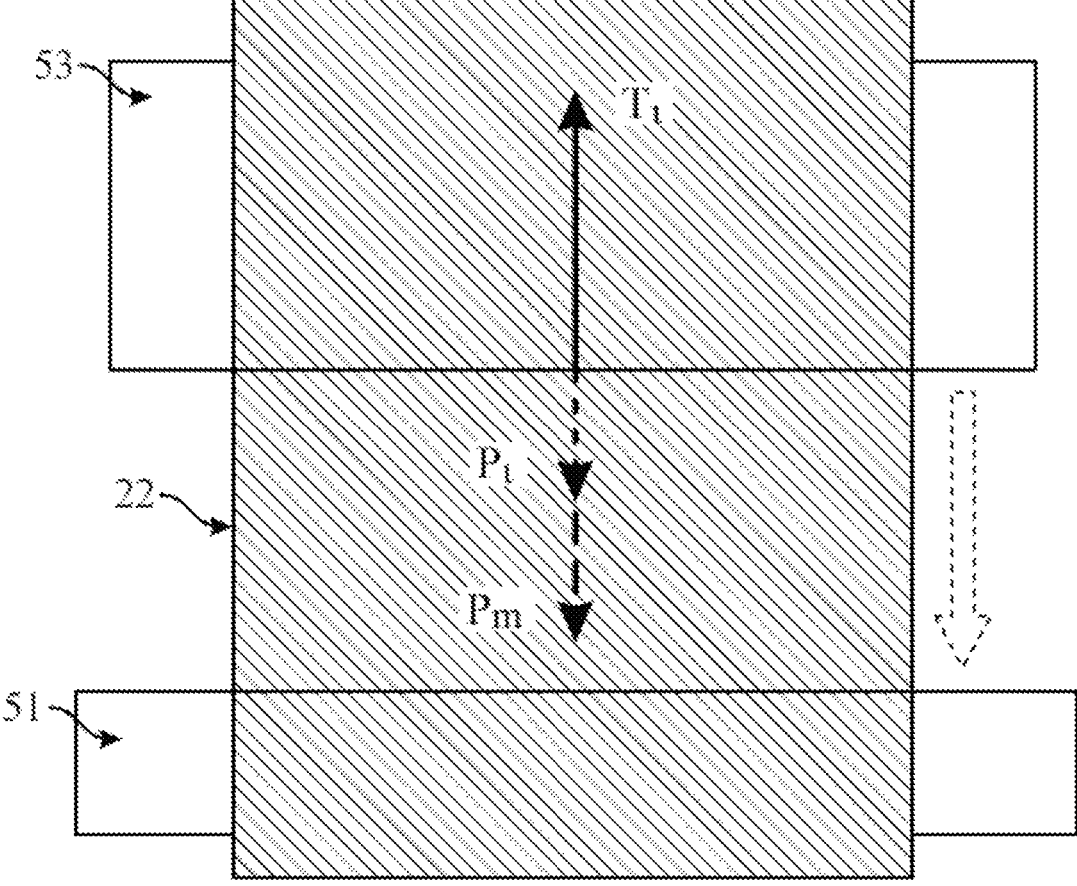

In other words, the apparatus resistance force, $T_l$, is equal to the driving force, P, and the additional force, $P_m$, combined (i.e. added)—see FIG. 7 (in which the broken line arrow indicates the direction of movement of the tow material 22).

During a shearing operation (i.e. steering of the tow material 22 through a shearing action using the shearing mechanism 5), the forces may be expressed as:

$$T_l = P_l + P_m$$

Figure 8:
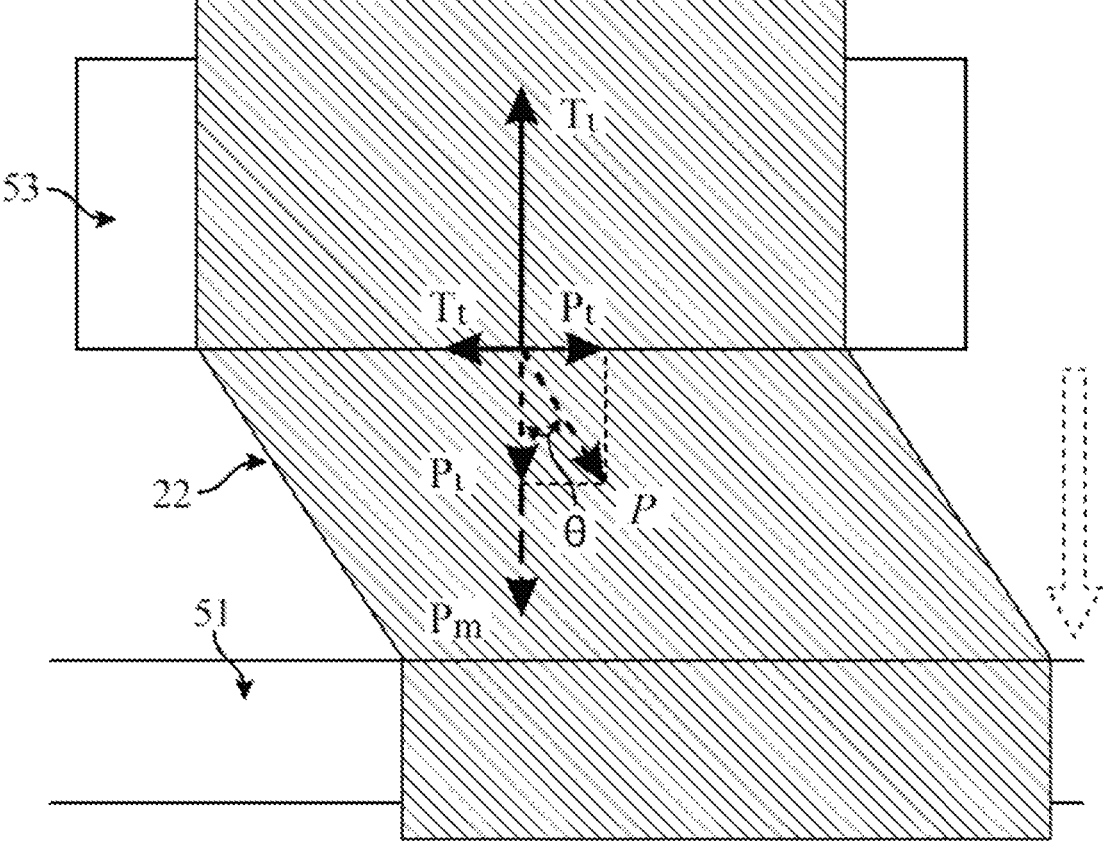

In other words, the apparatus resistance force, $T_l$, is equal to a longitudinal component of the driving force, $P_l$, and the additional force, $P_m$, combined (i.e. added)—see FIG. 8 (in which the broken line arrow indicates the direction of movement of the tow material 22).

The tension control system 7 may seek to control the additional force, $P_m$, through active control as described herein. Therefore, it is possible for the tension control system 7 to seek to regulate this additional force, $P_m$, to increase the maximum shearing angle which can be achieved without substantive lateral slippage of the tow material 22 across the gripping shoe 53:

$$P_t = (T_l - P_m)\tan \theta$$

The tension control system 7 may seek to control the apparatus resistance force, $T_l$, through active control also as described herein (and so the apparatus resistance force, $T_l$, may also be considered to be a tensioning force which may be varied by the controller 73—in addition to the additional force, $P_m$).

In other words, the driving force transverse component, $P_t$, can be controlled in order to maintain the no-slip condition defined by:

$$P_t \leq T_{t,max}$$

By adjusting the additional force, $P_m$, the tension control system 7 is also able to adjust the tension of the tow material 22 in the shearing mechanism 5 (e.g. between the compaction shoe 51 and the gripping shoe 53).

The tension control system 7 may be configured, therefore, to adjust the additional force, $P_m$, in order to seek to avoid the driving force transverse component, $P_t$, from exceeding the maximum transverse frictional force, $T_{t, max}$.

The tension control system 7 may be configured, additionally, to adjust the additional force, $P_m$, in order to maintain a predetermined minimum tension of the tow material 22 in the shear mechanism 5 (e.g. between the compaction shoe 51 and the gripping shoe 53). This predetermined minimum may be, for example, one of the one or more operational parameters (i.e. a set point for the tension of the tow material 22).

The minimum tension of the tow material 22 in the shearing mechanism 5 may be required in order to reduce defects in the laid tow material 22. This may include, for example, seeking to ensure that reinforcement fibres 22a of the tow material 22 slide with respect to each other.

As will be understood, the minimum tension of the tow material 22 in the shearing mechanism 5 may be dependent on factors such as the shear stiffness of the tow material 22, the resistances to slippage of the reinforcement fibres 22a with respect to each other (which may be a characteristic of the fibres 22a and/or the binder or resin material), the width of the tow material 22 (i.e. the depth across the shearing mechanism 5 (perpendicular to a longitudinal axis of the tow material 22), the distance between the compaction shoe 51 and the gripping shoe 53, and/or similar factors.

The additional force, $P_m$, can be adjusted by the tension control system 7, in some embodiments, to provide a predetermined tension profile of the tow material 22. This tension profile may be dependent on parameters such as the tow material 22, the speed of movement of the head with respect to the mould 3, the shear angle, or other properties of the tow material 22 or laying process.

Figure 9:
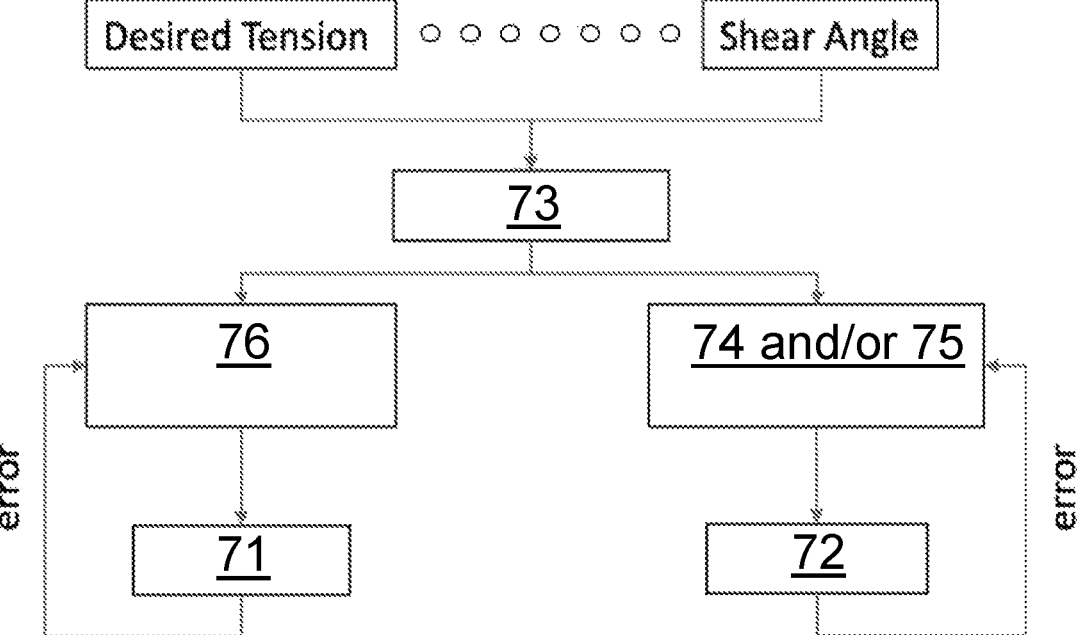
FIG. 9 shows a control regime which may be used by the tension control system of some embodiments.

With reference to FIG. 9 the tension control system 7 may be configured to use the predetermined tension (i.e. a desired tension) of the tow material 22 in the shearing mechanism 5 and the shear angle—both of which may be examples of operational parameters as discussed herein.

The predetermined tension of the tow material 22 in the shearing mechanism 5 may be a range of tensions from the minimum tension discussed herein to a maximum tension which may be at or below the tension required to maintain the non-slip condition. Whilst no slippage of the tow material 22 across the gripping shoe 53 is ideal, it may—as will be appreciated—be acceptable to permit some slippage in certain applications (e.g. in which resultant defects can be tolerated). In some applications, no slippage may be vital and, as such, the maximum tension may be below the theoretical tension required to maintain the non-slip condition by a safety margin (which may be 1% or more of the theoretical tension, 5% or more of the theoretical tension, 10% or more of the theoretical tension, or 20% or more of the theoretical tension, for example).

In order to determine the maximum tension (be it the predetermined tension itself or used in the setting of the predetermined tension (which may be a range)), it may be necessary to determine one or more characteristics of the operation of the tow laying head 1 and/or the tow laying system 100.

For example, it may be necessary to determine the maximum transverse frictional force, $T_{t,\ max}$ and/or one or more components of the apparatus resistance force, $T_l$.

The or each characteristic may be determined through experimentation, for example—e.g. laying tow material 22 using the tow laying head 1 and/or system 100, and then inspecting the laid tow material 22 for defects. In some embodiments, the maximum transverse frictional force, $T_{t,\ max}$ may be determined through the provision of one or more tape edge detectors.

The or each tape edge detector (of which there may be two) may be positioned with respect to the gripping shoe 53 (and/or the compaction shoe 51 and/or the tow guide roller 52) to detect impingement of the tow material with the detector(s)—at a point at which the tow material 22 enters or leaves the gripping zone, for example, or may detect the backing material 21 instead (e.g. after the backing material 21 is removed from the tape material 22).

Accordingly a tape edge detector may be located at or towards one end of the gripping shoe 53 (or other component) and configured to detect slippage of the tow material 22 such that it impinges the detector. Tape edge detectors arranged in pairs may be located at or towards opposing ends of the gripping shoe 53, (or other component) for example.

Figure 17:
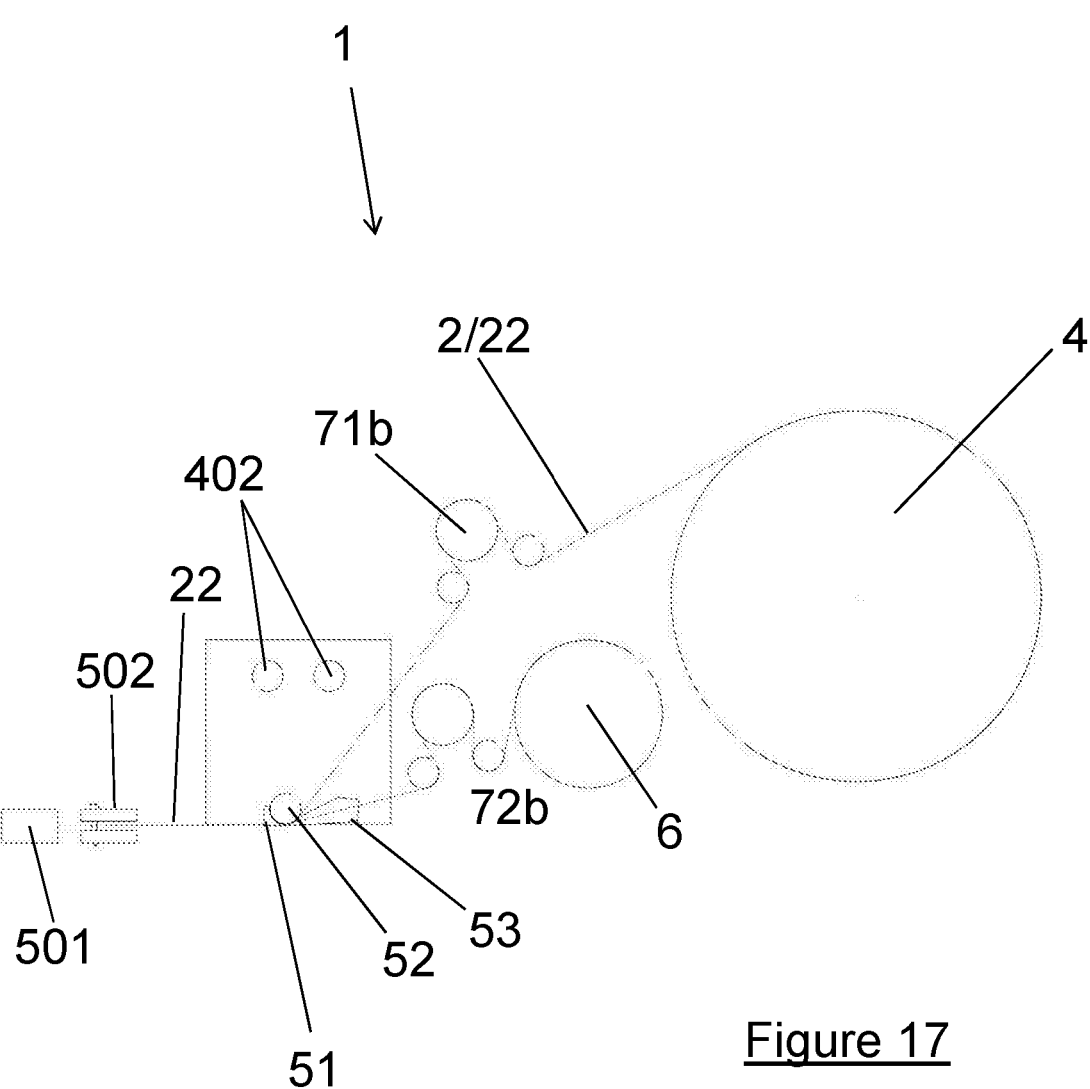
FIG. 17 shows a schematic representation of a tape laying head of some embodiments with a test apparatus.

In some embodiments, the or each characteristic (and hence the maximum tension), some embodiments may include a test apparatus which includes an anchor 501 and a load cell 502 (see FIG. 17). The tow material 22 may be tethered to the anchor 501 and may pass through the load cell 502 between the anchor 501 and the compaction mechanism 5. This may be used to determine the tape tension (i.e. the tension of the tow material 22) for various different operating conditions (e.g. different speeds of movement of the compaction mechanism 5, with respect to the anchor 501). In other embodiments, the test apparatus may include a motor driven creel instead of an anchor 501—in which case movement of the compaction mechanism 5 relative to the creel is not required since the creel can be rotated to apply tension to the tow material 22.

Accordingly, during use of the system 100 and/or head 1, slippage may be detected and this may be used to identify the transverse frictional force at which this occurs and so the maximum transverse frictional force, $T_{t,\ max}$. This may allow, for example, the maximum transverse frictional force, $T_{t,\ max}$ to be modelled with respect to operational parameters of the system 100 and/or head 1 (such as the speed of the head with respect to the mould 3).

These one or more characteristics may be received as inputs to the tension control system 7 (e.g. to controller 73 (e.g. to the or each processor 73a, which may be via the input/output interface 73d)) and may be manually entered from a user interface device 8 which may be communicatively coupled to the tension control system 7 (e.g. via a wired or wireless communication link).

The or each characteristic may be stored on the computer readable medium 73c, for example, for later retrieval and use by the processor(s) 73a.

Similarly, in order to determine the predetermined tension (e.g. the minimum tension of a range or the predetermined tension itself) it may be necessary for the tension control system 7 (e.g. the controller 73 (e.g. the or each processor 73a via the input/output interface 73d)) to receive one or more characteristics of the tow material 22—such as its shear stiffness. These one or more characteristics may enable the tension control system 7 (e.g. the controller 73, using the or each processor 73a) to determine the predetermined tension or may be the predetermined tension itself (which may be the minimum tension of a range, for example).

Again, these one or more characteristics may be manually entered via the user interface device 8 and may be stored on the computer readable medium 73c, for example, for later retrieval and use by the processor(s) 73a.

The or each of these characteristics may be determined through experimentation, for example—e.g. laying tow material 22 using the tow laying head 1 and/or system 100, and then inspecting the laid tow material 22 for defects. Other options include the use of a test rig and/or models generated from experimental results.

Furthermore, some versions of the system 100 or the tension control system 7 may include a backing material collector 6 which is driven with a fixed torque or a backing material collector 6 which is coupled with the creel 62 via a clutch mechanism (not shown)—which may be a friction clutch. A resisting force and a driving force of the backing material collector 6 in such instances may be measured experimentally to calibrate the system 100.

These and other such systems 100,7 may include one or more sensors (e.g. ultrasonic and/or contact sensors) which detect a change in the diameter of the creels (as material is released or collected) and can adjust the operation of the system 100,7 accordingly to achieve the required tow material 22 tension.

The shear angle which is used as an input to the tension control system 7 may be a fixed shear angle for a particular operation of the tow laying head 1 or may be varied during operation of the tow laying head 1. Accordingly, this shear angle may be a maximum shear angle required for a particular operation of the tow laying head 1 or may be varied—substantially in real-time—during operation of the tow laying head 1.

These inputs may be received by the controller 73 of the tension control system 7 and may be passed to the processor(s) 73a. Operations of the controller 73 will be understood to be, therefore, resulting from operations of the processor(s) 73a and those operations may be the result of the execution of instructions stored on the computer readable medium 73c.

The controller 73 may also, as described, be configured to receive the first and second load sensor signals. These may be used as feedback for the controller 73, for example.

Using one or more of these inputs the controller 73 may be configured to generate the first and second motor control signals and the brake signal, in order to control the tension in the tow material 22 in the shearing mechanism 5, as described.

The actual tension in the tow material 22 in the shearing mechanism 5 cannot be measured directly as this would interfere with the shearing operation. However, the tension may be estimated or determined by use of the following equation:

$$P = \frac{T_l - P_m}{\cos(\theta)}$$

In particular, the apparatus resistance force, $T_l$, may be known (e.g. as an experimentally determined characteristic of the tape laying head 1 and as a result of the tension of the tow material 22 upstream of the shearing mechanism 5 (e.g. as determined using the first load sensor 71)). The apparatus resistance force may be stored in a lookup table and there may be different resistance forces for different respective operational parameters of the system 100 and/or head 1 (e.g. for different speeds of movement of the head with respect to the mould). Instead of a lookup table, the apparatus resistance force may be determined using a model of the resistance force under different operational parameters. The shearing angle, e, may likewise be a parameter provided to the controller 73, as described. The additional force, $P_m$, is a force which is provided by operation of the tension control system 7 and may be represented by the tension of the backing material downstream of the shearing mechanism 5.

The tension of the tow material 22 between the shearing boundaries may be represented by the driving force, P.

The controller 73 may, therefore, be configured to control the first and/or second motor control signals and/or the brake signal, to regulate (i.e. vary) the tension of the tow material 22 between the shearing boundaries. The controller 73 may monitor this tension in the tow material 22 (i.e. by monitoring the driving force, P). The control of the first and/or second motor control signals and/or the brake signal may regulate (i.e. vary) the apparatus resistance force, $T_l$, and/or the additional force, $P_m$—which, in turn, regulate the tension of the tow material 22 between the shearing boundaries. This regulation may be active regulation during operation of the tape laying head 1.

The effects of the regulation may be determined by use of the first and second load sensor signals, which provide feedback in relation to the apparatus resistance force, $T_l$, and/or the additional force, $P_m$. This feedback may be used as an indirect measure of the tension of the tow material 22 between the shearing boundaries (as represented by the driving force, P)—which is, therefore, monitored.

This feedback may result is further variations, by the controller 73, of the first and/or second motor control signals and/or the brake signal. In some embodiments, the controller 73 may be configured to make such variations in relation to the first and/or second motor control signal based on the second load sensor signal.

In some embodiments, the controller 73 may be configured to make such variations in relation to the brake signal based on the first load sensor signal. In some embodiments, the controller 72 is configured to make such variations based, at least in part, on the diameter of the backing material collector 6 and/or the tape supply 4 (and/or the associated creels 42/62).

As already described, the tension control system 7 may be used, in some embodiments, with a tape 2 which does not include a backing material 21 (in other words, the tape laying system 100 may not include the backing material collector 6). The tow material 22 can, in such embodiments, be adhered to the surface of the mould by using, for instance, a binder.

Tension Zone Isolation

In accordance with some embodiments, the tension of the tow material 22 and the backing material 21 can be isolated and substantially independently controlled in different zones within the tow laying head 1.

In particular, these zones may include a first zone from the tape supply 4 to the shearing mechanism 5 (and, in particular, to the gripping zone), a second zone within the shearing mechanism 5 (and, in particular, between the shearing boundaries), and a third zone between the shearing mechanism 5 and the backing material collector 6 (and, in particular, from the compaction shoe 51). This may be achieved, for example, in relation to the first zone, through the application of an adequate force on the tow material 22 by the tow guide roller 52 and gripping shoe 53 to cause the isolation.

In some embodiments, therefore, a tension of the tow material 22 and a tension of the backing material 21 may be controlled substantially independently of the tension of the tow material 22 between the shearing boundaries. In other words, the tension of the tow material 22 in the second zone may be controlled substantially independently of the tension of the tow material 22 or backing material 21 in the first and third zones.

This may permit, for example, higher acceleration and declaration of the movement of the compaction shoe with respect to the mould 3 without substantively impacting the laying operation (i.e. without excessive tension in the second zone).

Accordingly, some embodiments may include pressing the gripping shoe 53 against the tow guide roller 52 with sufficient force to decouple the tension in the second zone from that of the first and/or third zones. The tension in the first and/or third zones may then be increased, such that higher acceleration and/or deceleration of the movement of the compaction shoe 51 can be achieved without substantive impact on the shearing operation.

Web Mechanism

As described herein, the tow material 22 may include a binder or resin material and this may make the tow material tacky and so prone to adhere to the compaction shoe 51. This, in turn, may mean that materials for the compaction shoe 51 construction need to be such that this risk of inadvertent adhesion is reduced. Moreover, during laying of the tow material 22 and shearing of the tow material 22, the material 22 thickness increases and its width decreases which imposes lateral compression stress on the tow material 22 (due to the shear deformation of the tow material 22). This can cause buckling and so defects (e.g. wrinkles).

Some embodiments may, therefore, include a web mechanism 200. The web mechanism 200 is configured to apply a web 201 of material to a side of the tow material 22 which contacts the compaction shoe 51. This addition may be performed by the web mechanism 200 prior to that tow material reaching the compaction shoe 51 and/or the tow guide roller 52 and/or the gripping shoe 53.

The web 201 may increase the lateral buckling resistance of the tow material 22 and/or may provide a surface to contact the compaction shoe 51 which is less likely to adhere thereto (and the web 201 need not include a binder).

Figure 12:
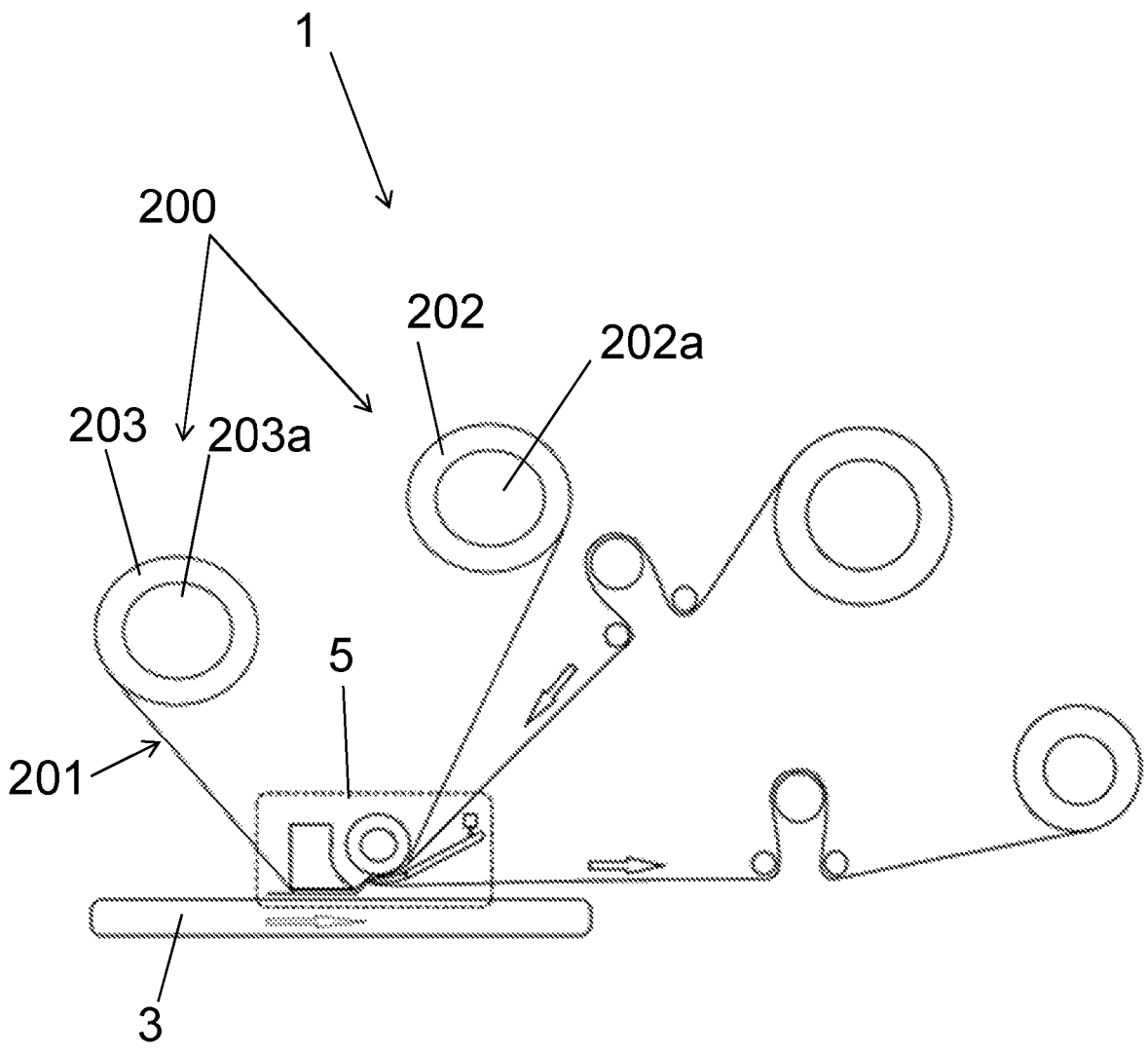
FIG. 12 shows a schematic representation of a tape laying head of some embodiments.

The web mechanism 200 is depicted, for example, in FIG. 12. As can be seen, FIG. 12 is a modification of the embodiments described with reference to FIG. 3 and will not be described again for the sake of brevity (moreover many of the reference numerals are omitted from FIG. 12 for simplicity). Reference should, therefore, be made to FIG. 3 and the associated parts of the description.

The web mechanism 200 may include a source of web material 202 and a web material collector 203. The source of web material 202 may be associated with a brake 202*a* configured to brake the release of web 201 from the source 202. The source of web material 202 may be in the form of a creel, for example, about which is wound a supply of the web 201. The source of web material 202 may generally be located towards an upstream side of the shearing mechanism 5 (in terms of the movement of the tow material 22. The source of web material 202 may generally be located behind the shearing mechanism 5 in terms of its direction of travel with respect to the mould 5.

The web material collector 203 may be associated with a motor 203*a* configured to pull web 201 from the source 202. The web material collector 203 may be in the form of a creel, for example, about which is wound used web 201. The web material collector 203 may generally be located in front of the shearing mechanism 5 in terms of its direction of travel with respect to the mould 5.

The web 201 may pass (along an associated path) from the source of web material 202 to meet with the tow material 22 in advance of that tow material 22 entering the gripping zone (e.g. the path between the tow guide roller 52 and the gripping shoe 53). The web 201 may be pressed onto the tow material 22 by the action of the tow guide roller 52 and the gripping shoe 53. The web 201 may be positioned such that it is between the tow material 22 and the tow guide roller 52.

The path of the web 201 may pass the compaction shoe 51, following the path of the tow material 22. After the tow material 22 has been laid on the mould 3 by the compaction shoe 52, the web 201 may be removed from the tow material 22 and passed to the web material collector 203. This may be achieved by positioning the web material collector 203 relative to the compaction shoe 51 such that the web 201 is lifted from the tow material 22 as the tow material 22 (and web 201) leave the compaction shoe 51. As such, the web material collector 203 may be located further away from the mould 3 than the compaction shoe 51 is from the mould 53.

The operation of the brake 202*a* and the motor 203*a* of the web mechanism 200 may be controlled by the controller 73 (or a separate controller may be provided).

As will be understood, the web 201 is positioned between the tow material 22 and the compaction shoe 51. As such, there is a reduced risk of inadvertent adhesion of the tow material 22 to the compaction shoe 51. Furthermore, the web 201 provides structural support to the tow material 22. This may be particularly useful in relation to delicate (e.g. thin) tow material 22.

Ideal properties of the web 201 include:

exhibit a low shear stiffness and good shearing quality (i.e. few or substantially no wrinkling or other defects during shearing);

exhibit a high lateral compression buckling resistance (e.g. by having fibres or reinforcement members in the perpendicular direction in respect to the path of the tow material 22) (the lateral compression buckling resistance may be equal to or higher than that of the tow material 22 for example);

adhere to the tow material 22 and be dis-bonded as required;

a top surface with low coefficient of friction; and exhibit a higher shear locking limit than the tow material 22 or the maximum shear angle of the path (whichever the highest).

The shear locking limit may be defined as the shear angle at which fibres can no longer be rearranged during deformation (i.e. the fibres are locked). Thus further shear deformation (further increasing the shear angle) will lead to the formation of defects such as wrinkling. Intra tow shear is not possible beyond the shear locking limit (i.e. the fibres cannot slip/re-arrange).

The web 201 may be a peel-ply tape. The web 201 may be a woven material and may be formed from low friction fibres. The web 201 may be formed from Polytetrafluoroethylene (PTFE) (such as Teflon®), for example. The web 201 may have longitudinal and transverse fibres which may be substantially perpendicular to each other.

The web 201 may include an adhesive on one side thereof, and that side may be the side which contacts the tow material 22 in use.

Compaction Roller

Embodiments herein have generally been described with reference to a compaction shoe 52. In some embodiments, however, a compaction roller 300. In this respect, please see FIGS. 13-15. In some such embodiments, the compaction roller 300 may take the place of the compaction shoe 51 and the tow guide roller 52 may not be present. Instead, the gripping shoe 53 may engage the compaction shoe 51—in other words, the compaction roller 300 may perform the roles of both the compaction shoe 51 and the tow guide roller 52. Such embodiments may be implemented with the other embodiments described herein, for example to control the tension in the tow material 22 and/or the tension zone isolation as described.

Figure 13:
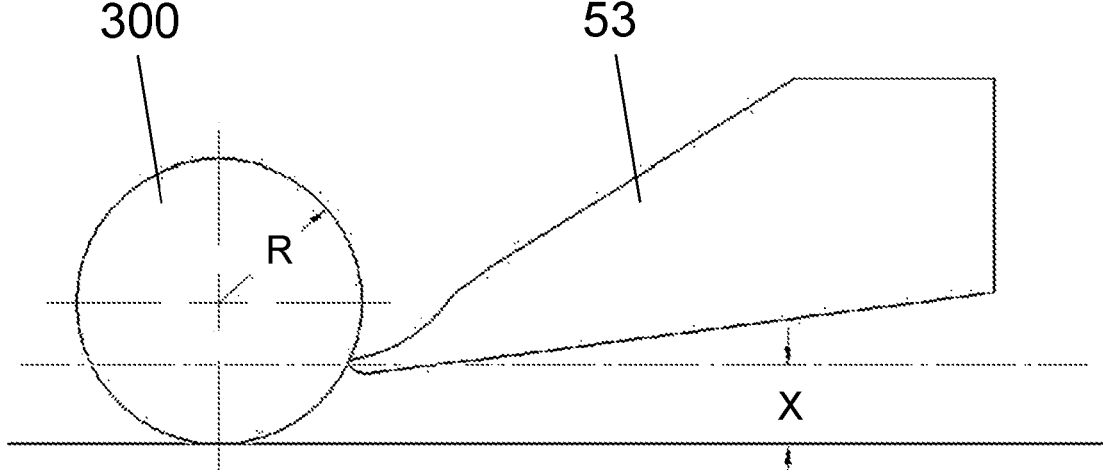
FIGS. 13-15 show compaction rollers and gripping shoes of some embodiments.
Figure 14:
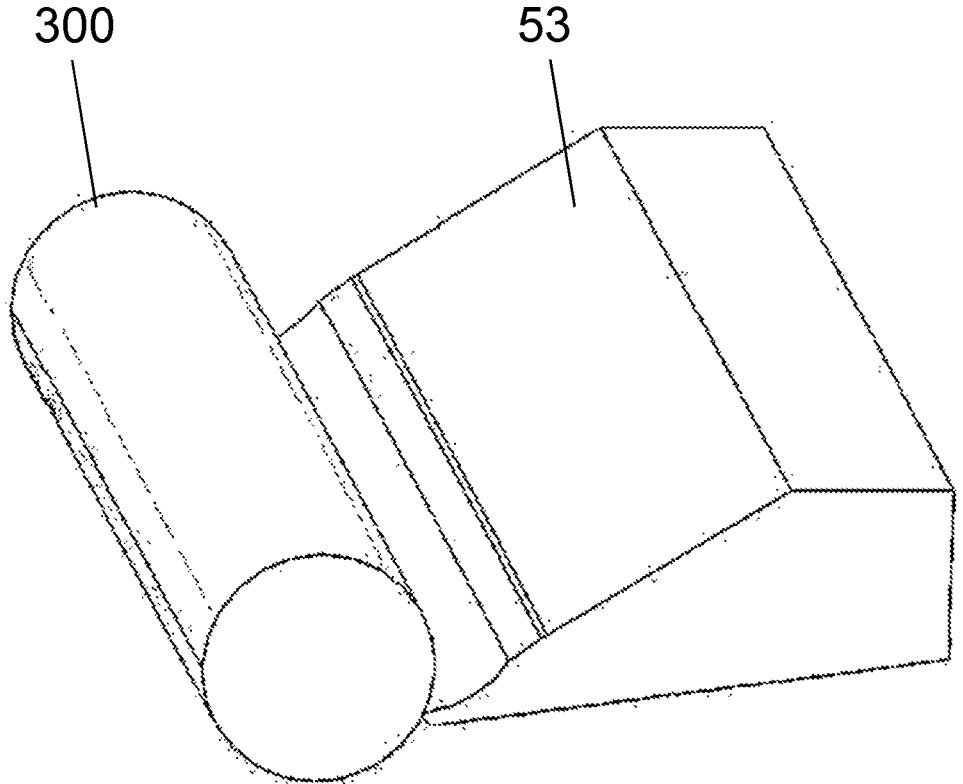
Figure 15:
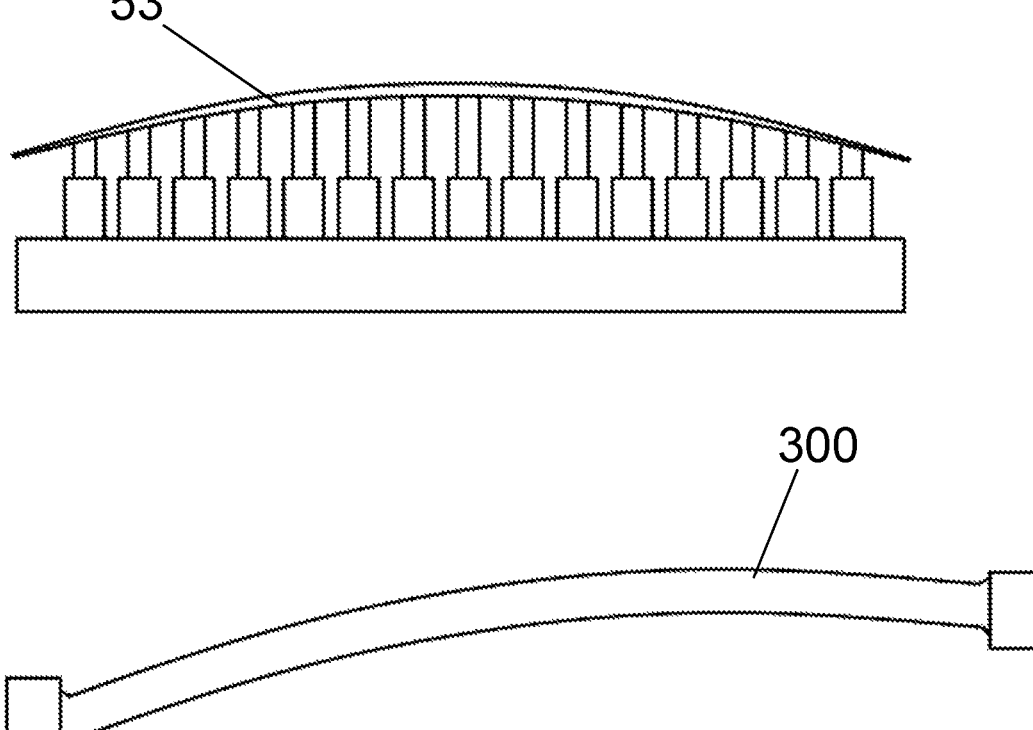

As can be seen in FIGS. 13 and 14, in particular, a radius (R) of a cross-section through the compaction roller 300 may be greater than a distance (X) between the contact point of the gripping shoe 53 (e.g. at its extreme distal end) and the compaction roller 300. This contact point may be below a mid-point of the compaction roller 300 (which may be a central axis therethrough and this may be a rotational axis of the compaction roller 300). The compaction roller 300 is configured to rotate about an axis which is generally perpendicular to the path of the tow material 22. The compaction roller 300 may be As will be understood, the shearing of the tow material 22 may, in such embodiments, occur between the contact point of the gripping shoe 53 and compaction roller 300, and the contact point between the compaction roller 300 and the mould 3 (such points, of course, being lines in some embodiments).

In accordance with some embodiments, the radius of a cross-section through the compaction roller 300 can be reduced to provide a minimal shearing gap (i.e. the distance between two shearing boundaries). This in turn promotes intra tow shear, as the effective length of contact between adjacent fibres is minimised (referring to the part of the tow material 22 that is being sheared), reducing the associated friction and permitting the sliding or rearranging of the fibres.

As described herein, the compaction roller 300 may be configured to rotate with respect to the gripping shoe and the mould 3. This rotation may be driven by movement of the compaction roller 300 over the mould 3 and/or may be driven directly by a motor. In some embodiments, however, compaction roller 300 is fixed from rotation with respect to the gripping shoe 53 and the mould 3—in which case, the compaction roller 300 may slide over the mould 3.

The compaction roller 300 may be formed from (or coated in) PTFE, for example. The compaction roller 300 may be formed from a relatively low friction material. The compaction roller 300 may have a substantially rigid outer surface or may have a relatively soft outer surface. The compaction roller 300 may be formed from a silicone roller with a PTFE sleeve, in some embodiments. In some embodiments, the compaction roller 300 is sufficiently soft to enable the compaction roller 300 to conform to non-flat, non-uniform surfaces by deforming to match the surface variation of the mould 3.

An advantage of such embodiments may include the application of membrane stress on the part of the tow material 22 being sheared, which counter-balances the lateral compressive stress that the tow material may experience due to the shearing of the tow material (as the tow material is stretched around a surface of the compaction roller 300 during shearing). The stress will depend on the radius of the compaction roller 300 (a smaller radius leading to higher stress), the shearing gap (i.e. the distance between the shearing boundaries), and the tow material tension.

The lack of or reduction in out-of-plane shear stress (imposed on the tow material 22 due to, for example, minimisation of a sliding motion of the compaction roller 300 compared to the compaction shoe 51 embodiments) may reduce the risk of defects due to fibre splitting (particularly in tow materials which are tacky). The compaction roller 300 may only be required to slide to generate lateral movement required to enable shearing (i.e. motion parallel with a rotation axis of the compaction roller 300). The compaction roller can, in some embodiments, rotate about its rotation axis (i.e. unlike the compaction shoe 51 embodiments).

In some embodiments (with reference to FIG. 15), the compaction roller 300 may be flexible along its length—so that the compaction roller 300 can form a curve. The gripping shoe 53 may likewise be correspondingly flexible along its length to form a curve (in which case resilient biasing members may be provided along a length of the flexible gripping shoe 53 to maintain contact with the compaction roller 300, each resilient biasing member may include a sprung piston). This may allow the laying of the tow material on singly or doubly curved moulds 3, for example. In other words, such embodiments may permit use in relation to more complex moulds 3.

These embodiments may be used with or without the web mechanism 200.

Moreover, although a gripping shoe 53 is described, these embodiments may use a gripping roller.

Slip Compensation Mechanism

Some embodiments may include a slip compensation mechanism 400—see FIG. 16. The slip compensation mechanism 400 may be configured to provide some compensation for lateral slip of the tow material 22 with respect to the gripping shoe 53 and may be used in embodiments which have either a compaction shoe 51 or a compaction roller 300 (with or without the web mechanism 200) and may be implemented in combination with, for example, the other embodiments described such as the tension control and/or the tension zone isolation procedures. Indeed, in some embodiments, the slip compensation mechanism 400 may be applied to other tow material laying apparatuses, including that taught in GB2492594.

The slip compensation mechanism 400 may be configured to receive a signal indicative of slip of the tow material 22 with respect to the gripping shoe 53 and, in particular, may receive a signal indicative of slip more than a threshold distance. This slip will, as will be understood, lateral slip along the gripping shoe 53.

In some embodiments, the slip compensation mechanism 400 includes a sensor 401 to sense slip of the tow material 22 and generate the signal. In some embodiments, however, the sensor 401 is provided separately. Two potential sensor locations are depicted schematically in FIG. 16.

The sensor 401 may be a tape or web edge sensor.

The sensor 401 may include an optical sensor. The optical sensor may be configured to sense, for example, the blocking of light (such as infrared light) from a light source (which may be part of the sensor) by the tow material 22. Accordingly, the sensor 401 may be located upstream of the gripping shoe 53 with respect to the direction of travel of the tow material 22 and may be offset to one side of the normal path of the tow material 22. When and if the tow material 22 triggers the sensor 401 this, due to the position of the sensor 41, may be indicative of slip of the tow material 22. Similarly, the sensor 401 may be configured to sense lateral movement of the backing material 21 instead of the tow material 22, in the same manner but downstream of the gripping shoe 53. Of course, when sensing lateral movement of the tow material 22 this may be the tow material 22 and backing material 21 in combination in some embodiments.

The sensor 401 may include sub-sensors to detect lateral slip in a first and a second direction (with each sub-sensor configured to detect slip in one of the two directions).

The sensor 401 could take a number of different forms and another type of possible optical sensor is a camera which may capture and analyse images of the tow material 22. Non-optical sensors may be used and these may include, for example, an ultrasonic sensor.

Figure 18:
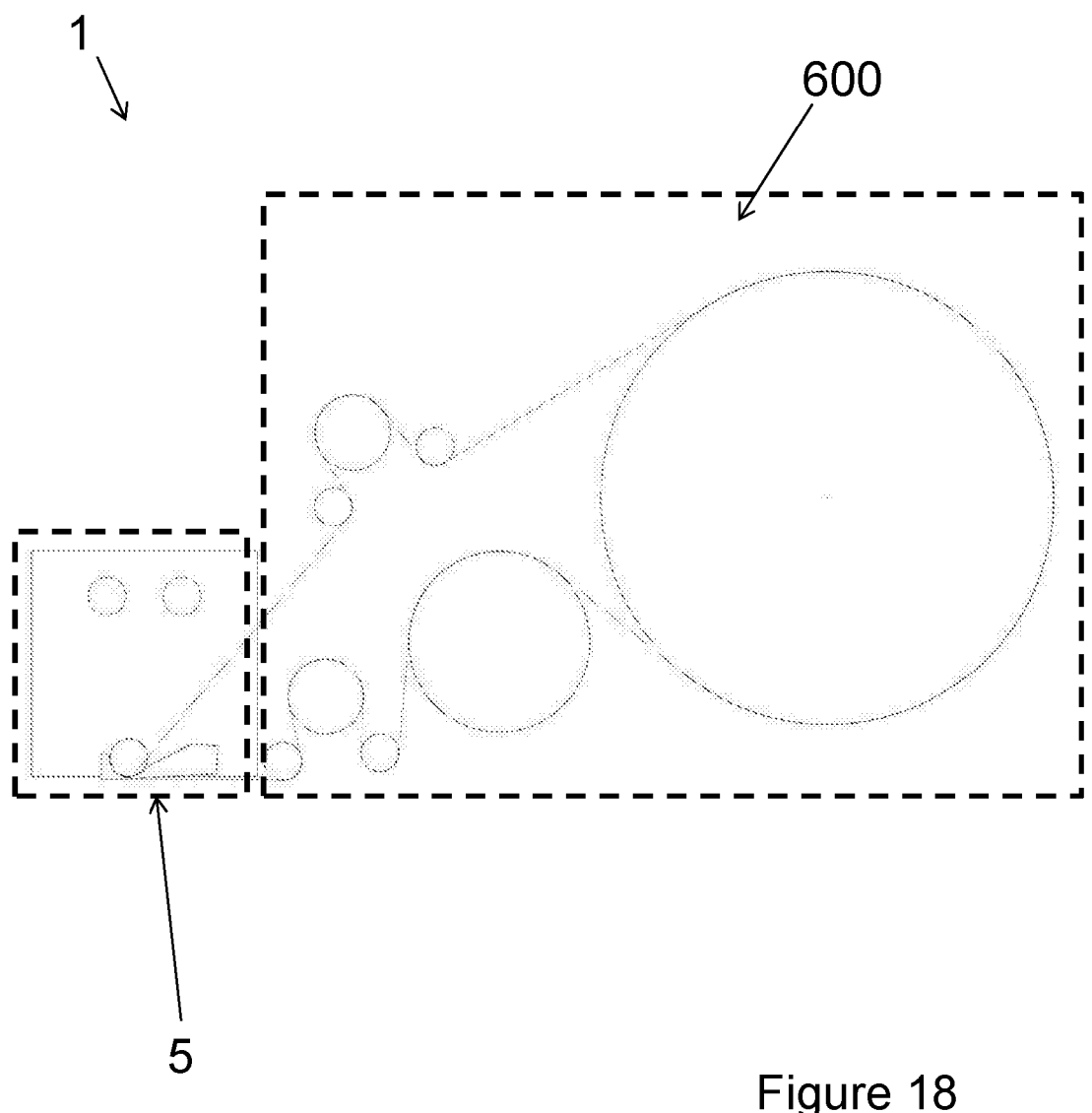
FIG. 18 shows a schematic representation of a tape laying head of some embodiments with the creel unit identified.

The slip compensation mechanism 400 may be configured to move the shearing mechanism 5 (and, in particular the shearing boundaries) laterally with respect to the tape supply 4 and/or the backing material collector 6 to correct the detected slip (as detected using the signal from the sensor 401). Therefore, the slip compensation mechanism 400 may be configured to move the shearing mechanism 5 (and, in particular, the shearing boundaries) in a direction which is perpendicular to the direction of travel of the compaction shoe 51 (or compaction roller 300) with respect to the mould 3. The tape supply 4 and/or the backing material collector 6 may be referred to as a creel unit 600—see FIG. 18, for example. The creel unit 600 may include the first and second load sensors 71,72. The slip compensation mechanism 400 may, therefore, be configured to move the shearing mechanism 5 with respect to the creel unit 600.

The shearing boundary created by the pressing of the compaction shoe 51 or compaction roller 300 (as the case may be) may be referred to as a first shearing boundary. The first shearing boundary can slide laterally on a surface of the laid tow material 22. The tow material 22 may be considered to be fixed (with respect to the mould) at this position, as the tow material 22 is adhered on a surface of the mould 3. Therefore, by displacing the shearing mechanism 51, the tow material 22 may be moved at a second shearing boundary (i.e. the boundary created the pressing of the gripping shoe 53 and the tow guide roller 52, or the pressing of the gripping shoe 53 on the compaction roller 300 (as the case may be). In some embodiments, however, only the second shearing boundary is moved.

The shearing boundary created by the pressing of the compaction shoe or the compaction roller (depending on which shearing mechanism is used) (first shearing boundary)

can slide laterally on the surface of the tape material. The tape material is also considered fixed at this position, as the tape is adhered on the surface of the mould. Thus by displacing the shearing mechanism in reality the tape is moved at the shearing boundary which is created by the pressing of the gripping shoe on the tow guide roller, or the pressing of the gripping shoe on the compaction roller (depending on which shearing mechanism is used) (second shearing boundary), which is also the origin point of the misalignment.

In a different instance of the mechanism only the second shearing boundary can be actuated. This however creates several complications in terms of packaging all the necessary components in the tape laying system.

The slip compensation mechanism 400 may include one or more rails 402, to which the shearing mechanism is mounted for movement therewith. The or each rail 402 may be carried by a mounting arrangement (e.g. one or more members which receive the or each rail 402, not shown) of another part of the head 1 or system 100 such that the or each rail 402 may be moveable with respect to the mounting arrangement during the lateral movement thereof as described above. Accordingly, the shearing mechanism 5 may be moveable with respect to the mounting arrangement (i.e. with respect to the other part of the head 1 or system 100). Movement of the shearing mechanism 5 with respect to the mounting arrangement may be driven in a number of different ways. For example, the slip compensation mechanism 400 may include a belt or chain drive arrangement, a pneumatic or hydraulic ram, or a rack and pinion drive arrangement, to drive the lateral movement of the shearing mechanism 5. In some embodiments, the or each rail 402 is part of the head 1 or system 100 and the mounting arrangement is mounted to the shearing mechanism 5.

Slip occurs at the gripping zone in some embodiments and so movement of the shearing mechanism 5 with respect to the tape supply 4 and/or the backing material collector 6 can be used to correct this slip. In some embodiments, the tow material does not contact any other part of the shearing mechanism 5 before it reaches the gripping zone.

Figure 19:
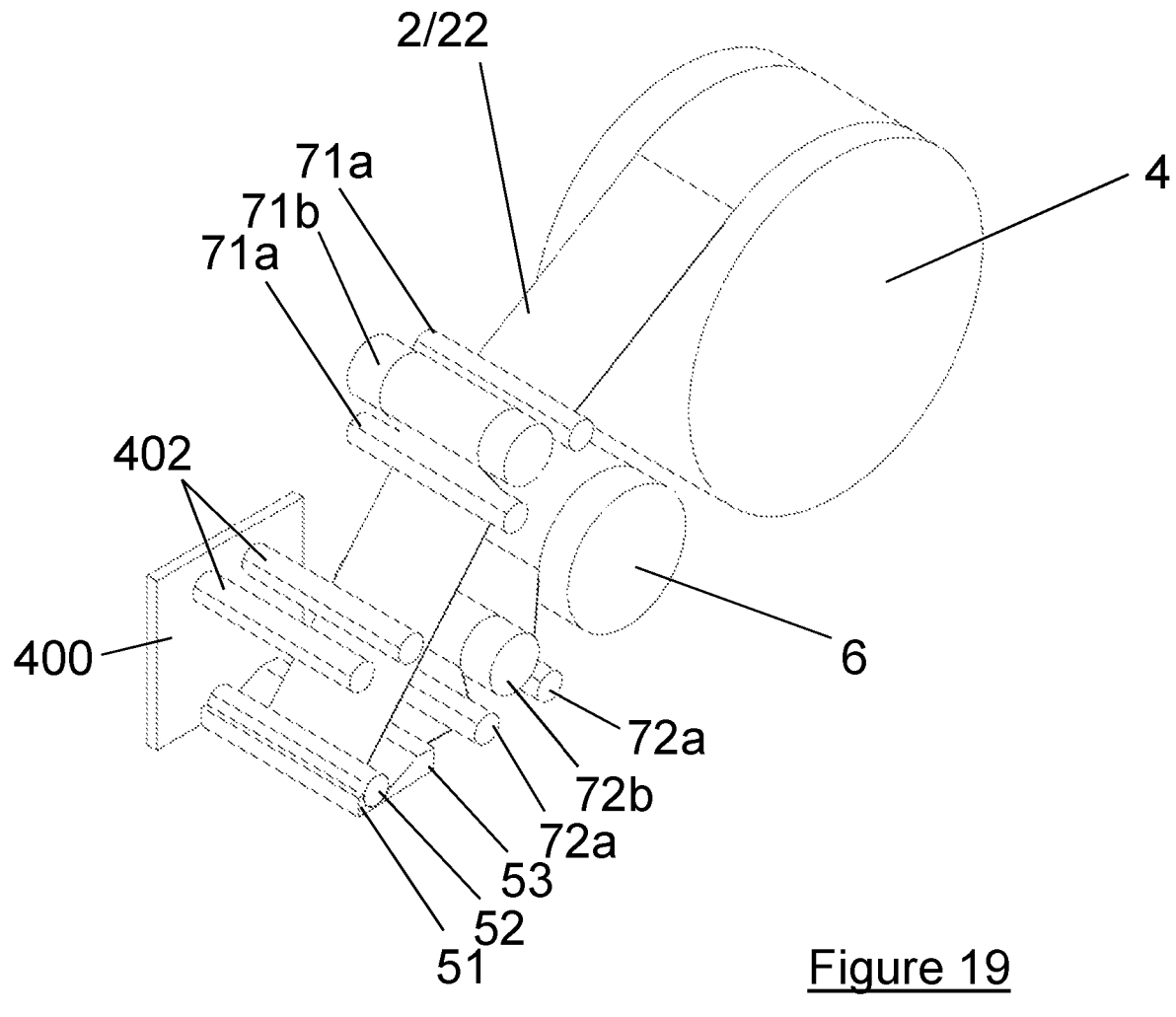
Figure 20:
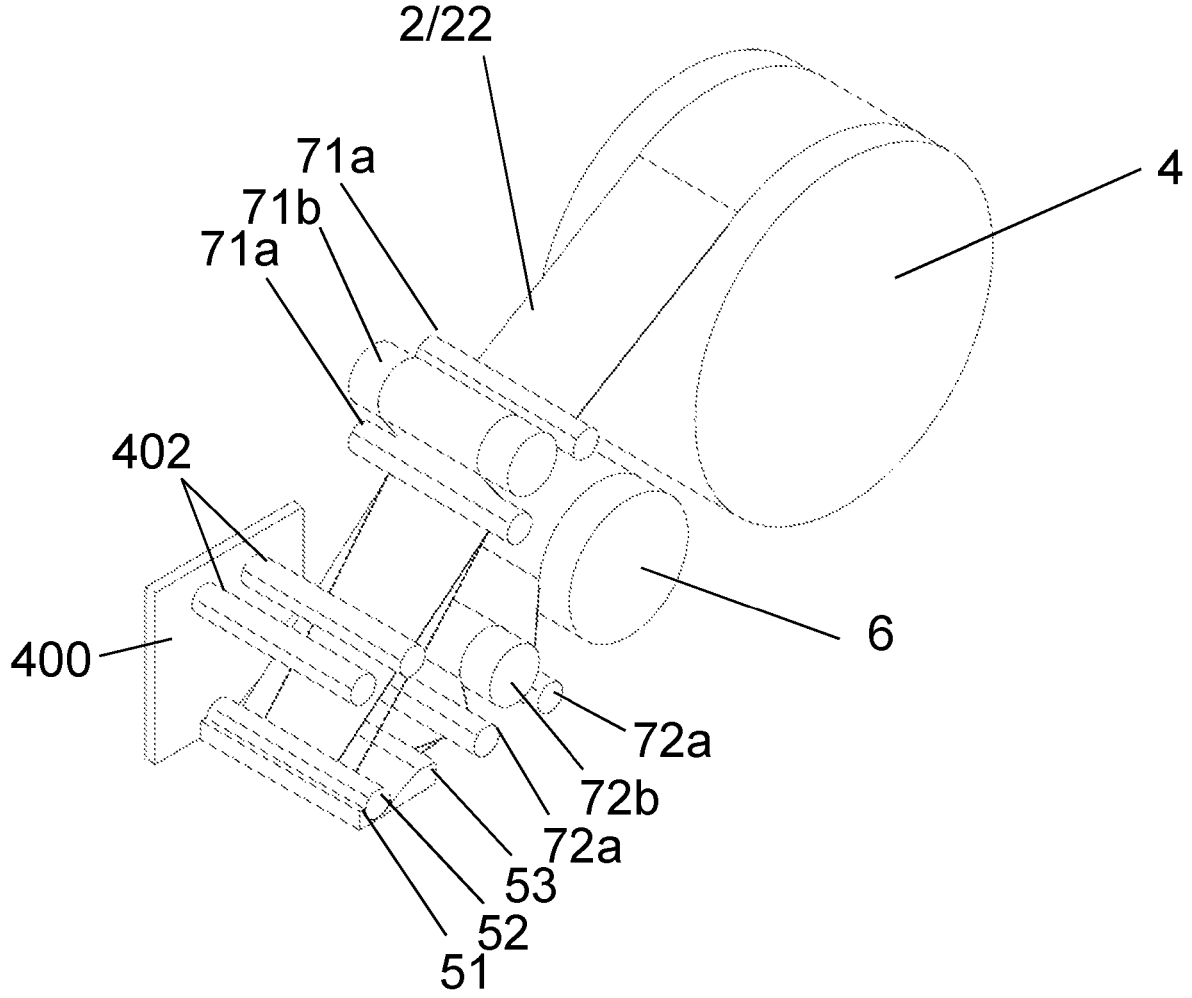

This is depicted, for example, in FIGS. 19-21. In FIG. 19, the shearing mechanism 5 is in a home location (with the tow material 22 substantially centrally located along the compaction shoe 51, for example. FIG. depicts the same arrangement but wherein slip has occurred—with the original tow material depicted in broken lines for reference). FIG. 21 depicts the shear mechanism 5 at one extreme of its location with respect to the creel unit 600, for example.

The possible lateral movement in this manner may be limited (e.g. by the length of the or each rail 402 or the driving arrangement). Therefore, in operation, it may be necessary to reset (or "home") the location of the shearing mechanism 5 with respect to the tape supply 4 and/or the backing material collector 6 (in a resetting operation). This may be achieved, for example, by disengaging the gripping zone (i.e. by disengaging the tow guide roller 52 and/or the gripping shoe 53 from each other) whilst the compaction shoe 51 (or compaction roller 300) is not in contact with the mould 3. The shearing mechanism 5 can then be moved before the gripping zone is re-engaged. Tension of the backing material 21 may be increased again after this is complete but before laying of tow material 22 starts (or restarts).

In some embodiments, the slip compensation mechanism 400 includes one or more boundary members (not shown). The of each boundary member is configured to restrain or substantially prevent lateral movement of the tow material during a reset operation. The or each boundary member may be positioned such that the tow material 22 will abut that boundary member to prevent movement (or further movement) of the tow material 22 laterally. The or each boundary member may be part of a guide member through or over which the tow material 22 may pass (e.g. prior to reaching the gripping zone). The guide member may include a pair of upright boundary members located such that one of the pair is on either side of the tow material 22. The guide member may include a plate over which the tow material 22 may pass and from which the boundary members extend.

In some embodiments, the slip compensation mechanism 400 may be configured to identify operations which have caused slip. These may be, for example, parameters of the operation of the system 100 and/or head 1 (such as speed of movement of the compaction shoe 51 or compaction roller 300 with respect to the mould 3). The slip compensation mechanism 400 may be configured to feed these back to the controller 73, which may adjust the operation of the system 100 and/or head 1 to reduce the risk of slip—e.g. by avoiding one or more of those operations or to compensate for them. This may include, slowing the movement of the release of tow material 22 from the tape supply 4 or adjusting the tension of the tow material 22.

Whilst embodiments have been described with reference to the shearing mechanism 5 as a whole being mounted to the or each rail 402 and moved by the slip compensation mechanism 400, in some embodiments, just the gripping shoe 53 and tow guide roller 54 are mounted to the or each rail 402 and moved by the slip compensation mechanism 400 (such movement being relative to, for example, the compaction shoe 51). In some embodiments, the gripping shoe 53 and two guide roller 54, in combination (without the compaction shoe 51), may be referred to as the pinch assembly.

Laving Operation

As will be appreciated, embodiments include a method of laying tow material 22 on the mould 3 in which shearing of the tow material 22 is used to steer the tow material 22 being laid. During the laying operation the tension control system 7 acts to adjust the tension of the tow material 22 in the shear mechanism 5 as described.

Other

The operations of the tension control system 7 and/or the web mechanism 200 and/or the slip compensation mechanism 400 may be controlled by the controller 73 which may be executing instructions using the or each processor 73a (the instructions being stored on the computer readable medium 73c). Embodiments, therefore, may include the instructions which may form a computer program. Embodiments also include the computer readable medium storing those instructions.

References to the tension of the tow material 22 in the shearing mechanism 5 are references to the tension of the tow material 22 between the shearing boundaries. In the depicted embodiments, these are defined by the compaction shoe 51 (e.g. the leading edge thereof) and the gripping shoe 53 (e.g. the extreme distal end thereof); however, other forms of shearing mechanism 5 are possible and this may result in the shearing boundaries being defined by different physical features of the tow laying head 1. It is to be understood that the same control techniques as described herein may be applied to a wide variety of different tow laying heads 1 with different forms of steering mechanism (of which the shearing mechanism 5 is just one example).

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

Although certain example embodiments of the invention have been described, the scope of the appended claims is not intended to be limited solely to these embodiments. The claims are to be construed literally, purposively, and/or to encompass equivalents.

The invention claimed is:

1. A tape laying head configured to lay a tow material on a mould in the construction of a composite structure, the tape laying head including:

a shearing mechanism including a compaction shoe or roller and a gripping shoe or roller, the shearing mechanism configured to receive tow material from a tow supply and to steer the tow material with respect to the mould by applying shear deformation to the tow material between a pair of shear boundaries defined by the shearing mechanism, wherein at least a first of the pair of shear boundaries is defined by the compaction shoe or roller and a second of the pair of shear boundaries is defined by the gripping shoe or roller, the shearing mechanism including a force generator being further configured to apply a driving force to the tow material, the driving force having a longitudinal component and a transverse component with respect to the tow material during steering of the tow material; and a tension control system including a controller and a first sensor to generate a first sensor signal representative of a tension of the tow material between the tow supply and the shearing mechanism, the controller being configured, using the first sensor signal, to control the transverse component of the driving force acting on the tow material to be equal to or less than a maximum transverse frictional force associated with the shearing mechanism, during steering of the tow material with respect to the mould using the shearing mechanism to apply shear deformation to the tow material with the compaction shoe or roller pressing the tow material onto the mould, by varying a tensioning force applied to the tow material by the tension control system and monitoring the driving force.

2. The tape laying head according to claim 1, wherein the first sensor includes a first load sensor configured to generate a first load sensor signal representative of the tension of the tow material between the tow supply and the shearing mechanism, wherein the first load sensor signal is used in monitoring the driving force.

3. The tape laying head according to claim 1, wherein the tow material is provided with a backing material, the shearing mechanism is configured to separate the tow material from the backing material, and the tension control system further includes a second sensor configured to generate a second sensor signal representative of a tension of the backing material between the shearing mechanism and a backing material collector, the second sensor signal being used in monitoring the driving force.

4. The tape laying head according to claim 3, wherein the shearing mechanism further includes a tow guide roller, and the tension control system further includes a first motor configured to drive rotation of the tow guide roller, the tensioning force being at least partially applied by the first motor.

5. The tape laying head according to claim 4, wherein the tension control system further includes a second motor configured to drive operation of the backing material collector, the tensioning force being at least partially applied by the second motor.

6. The tape laying head according to claim 3, wherein the tension control system further includes a brake associated with the tow supply and configured to brake the delivery of tow material from the tow supply to the shearing mechanism, the tensioning force being at least partially applied by the brake.

7. The tape laying head according to claim 1, wherein the first of the pair of shear boundaries is defined by a contact point between the compaction shoe or roller and the mould in normal operation and the second of the pair of shear boundaries is defined by a contact point between the compaction shoe or roller and the gripping shoe or roller.

8. The tape laying head according to claim 1, further including a web mechanism wherein the tow material is provided with a web prior to shear deformation of the tow material and the web mechanism is configured to remove the web from the tow material after the tow material has been laid on the mould.

9. The tape laying head according to claim 8, wherein the web mechanism is further configured to add the web to the tow material prior to shear deformation of the tow material.

10. The tape laying head according to claim 9, wherein the web mechanism includes a source of web material and a web material collector associated with a motor, the motor being configured to operate the web material collector to pull the web from the source of web material.

11. The tape laying head according to claim 1, further including:

a source of tow material and/or a backing material collector; and a slip compensation mechanism configured to move the shearing mechanism laterally with respect to the source of tow material and/or the backing material collector, such that lateral slip of the tow material is compensated.

12. The tape laying head according to claim 11, wherein the slip compensation mechanism includes:

one or more rails configured to enable movement with respect to a part of the head of one or more of: the shearing mechanism, or a tow guide roller and the gripping shoe or roller; and a driving arrangement to drive movement of the shearing mechanism, or the tow guide roller and the gripping shoe or roller.

13. The tape laying head according to claim 11, wherein the slip compensation mechanism further includes a further sensor configured to sense lateral slip of the tow material.

14. The tape laying head according to claim 1, wherein the tension control system is further configured to keep the driving force above a minimum threshold by varying the tensioning force.

15. The tape laying head according to claim 1, wherein the tow material is a pre-impregnated tow material.

16. The tape laying head according to claim 1, wherein the controller is configured to vary the tensioning force applied to the tow material based in part on a shear angle of the tow material during the steering of the tow material.

17. A tape laying system including:

a controller for use in a tension control system of the tape laying system, and a shearing mechanism including a compaction shoe or roller and a gripping shoe or roller, the shearing mechanism configured to receive tow material from a tow supply and to steer the tow material with respect to a mould by applying shear deformation to the tow material between a pair of shear boundaries defined by the shearing mechanism, wherein at least a first of the pair of shear boundaries is defined by the compaction shoe or roller and a second of the pair of shear boundaries is defined by the gripping shoe or roller, the shearing mechanism including a force generator configured to apply a driving force to the tow material, the driving force having a longitudinal component and a transverse component with respect to the tow material during steering of the tow material, wherein the controller is configured to receive a first sensor signal from a first sensor, the first sensor signal being representative of a tension of the tow material between the tow supply and the shearing mechanism, and to control, using the first sensor signal, the transverse component of the driving force acting on the tow material to be equal to or less than a maximum transverse frictional force associated with the shearing mechanism, during steering of the tow material with respect to the mould using the shearing mechanism to apply shear deformation to the tow material with the compaction shoe or roller pressing the tow material onto the mould, by causing variation in a tensioning force applied to the tow material and monitoring the driving force.

18. The tape laying system according to claim 17, wherein the first sensor is a first load sensor that creates a first load sensor signal representative of the tension of the tow material between the tow supply and the shearing mechanism, the first load sensor signal being used by the controller in monitoring the driving force.

19. The tape laying system according to claim 17, wherein the tow material is provided with a backing material and the shearing mechanism is configured to separate the tow material from the backing material, the controller being further configured to receive a second sensor signal representative of a tension of the backing material between the shearing mechanism and a backing material collector, the second sensor signal being used by the controller in monitoring the driving force.

20. The tape laying system according to claim 19, wherein the controller is further configured to output a first motor signal, the shearing mechanism further includes a tow guide roller, and a first motor drives rotation of the tow guide roller, the first motor signal controlling operation of the first motor and the tensioning force being at least partially applied by the first motor.

21. The tape laying system according to claim 20, wherein the controller is further configured to output a second motor signal, a second motor drives operation of the backing material collector, the second motor signal controlling operation of the second motor and the tensioning force being at least partially applied by the second motor.

22. The tape laying system according to claim 19, wherein a brake is associated with the tow supply and is configured to brake the delivery of tow material from the tow supply to the shearing mechanism, the controller being configured to generate a brake signal to control the brake and the tensioning force being at least partially applied by the brake.

23. The tape laying system according to claim 17, wherein the controller is further configured to keep the driving force above a minimum threshold by varying the tensioning force.

24. The tape laying system according to claim 17, wherein the tape laying system further includes a web mechanism, the tow material being provided with a web prior to shear deformation of the tow material and the controller is further configured to operate the web mechanism to remove the web from the tow material after the tow material has been laid on the mould.

25. The tape laying system according to claim 24, wherein the controller is further configured to operate the web mechanism to add the web to the tow material prior to shear deformation of the tow material.

26. The tape laying system according to claim 25, wherein the web mechanism includes a source of web material and a web material collector associated with a motor, the controller being further configured to operate the motor to pull the web from the source of web material.

27. The tape laying system according to claim 17, including:

a source of tow material and/or a backing material collector, and a slip compensation mechanism; and wherein the controller is further configured to operate the slip compensation mechanism to move the shearing mechanism laterally with respect to the source of tow material and/or the backing material collector, such that lateral slip of the tow material is compensated.

28. The tape laying system according to claim 27, wherein the slip compensation mechanism includes:

one or more rails configured to enable movement with respect to a part of the system of one or more of: the shearing mechanism, or a tow guide roller and the gripping shoe or roller; and a driving arrangement, wherein the controller is configured to operate the driving arrangement to drive movement of the shearing mechanism, or the tow guide roller and the gripping shoe or roller.

29. The tape laying system according to claim 27, wherein the controller is further configured to receive a further signal from a further sensor, the further signal being indicative of lateral slip of the tow material.

30. The tape laying system according to claim 17, wherein the controller is configured to vary the tensioning force applied to the tow material based in part on a shear angle of the tow material during the steering of the tow material.

31. A control method for use in a tension control system of a tape laying system, the tape laying system including a shearing mechanism including a compaction shoe or roller and a gripping shoe or roller, the shearing mechanism configured to receive tow material from a tow supply and to steer the tow material with respect to a mould by applying shear deformation to the tow material between a pair of shear boundaries defined by the shearing mechanism, wherein at least a first of the pair of shear boundaries is defined by the compaction shoe or roller and a second of the pair of shear boundaries is defined by the gripping shoe or roller, the shearing mechanism being further configured to apply a driving force to the tow material, the driving force having a longitudinal component and a transverse component with respect to the tow material during steering of the tow material, the method including:

providing tow material from the tow supply to the shearing mechanism;

pressing the tow material onto the mould using the compaction shoe or roller;

steering the tow material with respect to the mould using the shearing mechanism to apply shear deformation to the tow material with the compaction shoe or roller pressing the tow material onto the mould;

receiving a first sensor signal from a first sensor, the first sensor signal being representative of a tension of the tow material between the tow supply and the shearing mechanism, and controlling, using the first sensor signal, the transverse component of the driving force acting on the tow material to be equal to or less than a maximum transverse frictional force associated with the shearing mechanism, during steering of the tow material using the shearing mechanism, by causing variation in a tensioning force applied to the tow material and monitoring the driving force.

32. The control method according to claim 31, wherein varying the tensioning force applied to the tow material is based in part on a shear angle of the tow material during the steering of the tow material.

\* \* \* \* \*